(12) United States Patent
Kawamoto et al.

(10) Patent No.: US 9,212,307 B2
(45) Date of Patent: Dec. 15, 2015

(54) STABILIZER COMPOSITION, RESIN COMPOSITION, AND MOLDED PRODUCT USING SAME

(71) Applicant: ADEKA CORPORATION, Tokyo (JP)

(72) Inventors: Naoshi Kawamoto, Saitama (JP); Yoshinori Negishi, Saitama (JP); Takashi Ayabe, Saitama (JP); Tsuyoshi Urushihara, Saitama (JP); Tomomasa Tezuka, Saitama (JP); Shingo Yamada, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/396,986

(22) PCT Filed: May 23, 2013

(86) PCT No.: PCT/JP2013/064353
§ 371 (c)(1),
(2) Date: Oct. 24, 2014

(87) PCT Pub. No.: WO2013/176216
PCT Pub. Date: Nov. 28, 2013

(65) Prior Publication Data
US 2015/0119513 A1  Apr. 30, 2015

(30) Foreign Application Priority Data

May 24, 2012 (JP) ................................. 2012-119073
May 16, 2013 (JP) ................................. 2013-103854

(51) Int. Cl.
*C09K 15/14* (2006.01)
*C08K 5/375* (2006.01)
*C08L 101/00* (2006.01)

(52) U.S. Cl.
CPC ................ *C09K 15/14* (2013.01); *C08K 5/375* (2013.01); *C08L 101/00* (2013.01)

(58) Field of Classification Search
USPC ................................... 524/102, 326, 336, 395
See application file for complete search history.

(56) References Cited

U.S. PATENT DOCUMENTS 4,239,803 A * 12/1980 Ohzeki et al. ................. 428/379

FOREIGN PATENT DOCUMENTS

| JP | 51-70192 A | 6/1976 |
| JP | 52-154851 A | 12/1977 |
| JP | 54-83950 A | 7/1979 |
| JP | 55-149338 A | 11/1980 |
| JP | 57-190098 A | 11/1982 |
| JP | 3345843 B2 | 11/2002 |

OTHER PUBLICATIONS

International Search Report issued in PCT/JP2013/064353, dated Jul. 2, 2013.

* cited by examiner

*Primary Examiner* — Robert Harlan
(74) *Attorney, Agent, or Firm* — Birch, Stewart, Kolasch & Birch, LLP

(57) ABSTRACT

The present invention provides a stabilizer composition comprising a monoester and diester of alkylmercapto carboxylic acid of bisphenol sulfide, which is capable of maintaining good ease of handling without causing precipitation of solids even in low temperature environments. The stabilizer composition according to the present invention comprises: a diester represented by the following Formula (1):

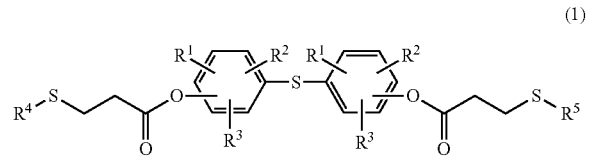

(1)

(wherein, $R^1$, $R^2$ and $R^3$ each independently represent a hydrogen atom or the like; and $R^4$ and $R^5$ each independently represent a linear or branched alkyl group having 3 to 30 carbon atoms which is optionally substituted); and a monoester represented by the following Formula (2):

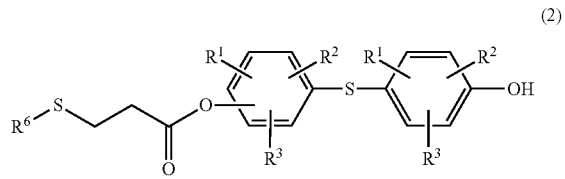

(2)

(wherein, $R^1$, $R^2$ and $R^3$ each independently represent a hydrogen atom or the like; and $R^6$ represents a linear or branched alkyl group having 3 to 30 carbon atoms which is optionally substituted)
wherein the content of the diester represented by the Formula (1) is more than 65 parts by mass and less than 80 parts by mass in a total of 100 parts by mass of the diester represented by the Formula (1) and the monoester represented by the Formula (2).

15 Claims, No Drawings

STABILIZER COMPOSITION, RESIN COMPOSITION, AND MOLDED PRODUCT USING SAME

TECHNICAL FIELD

The present invention relates to a stabilizer composition, a resin composition, and a molded article using the same. More particularly, the present invention relates to a stabilizer composition which has good ease of handling without causing precipitation of solids even in low temperature environments, a resin composition and a molded article using the same, as well as a stabilizer composition for synthetic resins which contains no solid, shows excellent heat resistant and has a low viscosity and good ease of handling, a synthetic resin composition and a molded article using the same.

BACKGROUND ART

So far, it is known that stabilizer compositions comprising a monoester and diester of alkylmercapto carboxylic acid of bisphenol sulfide impart excellent stabilization effect to various synthetic resins such as polyvinyl chloride resins, polyethylene resins, polypropylene resins, polybutene resins, polybutyrene terephthalate resins, polycarbonate resins, ABS resins, nylon 6, nylon 66, ethylene-vinyl acetate copolymers, petroleum resins and coumarone resins (Patent Documents 1 to 4).

In addition, it is also conventionally known that monoester and diester compounds of alkylmercapto carboxylic acid of bisphenol sulfide as well as thiodialkyl carboxylic acid dialkyl ester compound impart excellent stabilization effect to various synthetic resins such as polyvinyl chloride resins, polyethylene resins, polypropylene resins, polybutene resins, polybutyrene terephthalate resins, polycarbonate resins, ABS resins, nylon 6, nylon 66, ethylene-vinyl acetate copolymers, petroleum resins and coumarone resins (Patent Documents 1 to 4).

RELATED ART DOCUMENTS

Patent Documents

Patent Document 1: Japanese Unexamined Patent Application Publication No. S51-70192
Patent Document 2: Japanese Unexamined Patent Application Publication No. S52-154851
Patent Document 3: Japanese Unexamined Patent Application Publication No. S54-083950
Patent Document 4: Japanese Unexamined Patent Application Publication No. S55-149338

SUMMARY OF THE INVENTION

Problems to be Solved by the Invention

However, although the stabilizer compositions comprising a monoester and diester of alkylmercapto carboxylic acid of bisphenol sulfide do not have any particular problem with regard to the storage properties under a normal temperature environment of 25° C. or so, when they are stored for a long time in a low temperature environment of, for example, winter or a refrigerated warehouse, there is a problem that the stabilizer compositions are solidified and cannot thus be easily handled; therefore, an improvement is required. Patent Documents 1 to 4 describe excellent stabilization effect of such stabilizer compositions; however, there is no particular mention to the problem relating to the storage properties in long-term storage of the stabilizer compositions, nor any indication of solution to the problem.

In addition, heat stabilizer compositions comprising monoester and diester compounds of alkylmercapto carboxylic acid of bisphenol sulfide are highly viscous and thus have such problems that the pump that can be used for compounding the heat stabilizer compositions into a synthetic resin is restricted. This problem can be improved by incorporating a low-viscosity compound; however, in this case, since layer separation, clouding and/or solid precipitation may occur in the heat stabilizer compositions, there is a problem in terms of quality control. Moreover, there is also a problem that the hydroxyl groups contained in the heat stabilizer compositions inhibit crosslinking of synthetic resins, particularly polyethylenes and copolymers such as ethylene-vinyl acetate, ethylene-ethyl acrylate, ethylene-propylene and ethylene-propylene-butadiene copolymers.

In view of the above, an object of the present invention is to provide: a stabilizer composition comprising a monoester and diester of alkylmercapto carboxylic acid of bisphenol sulfide, which is capable of maintaining good ease of handling without causing precipitation of solids even in low temperature environments, a resin composition and a molded article using the same, as well as a stabilizer composition for synthetic resins which contains no solid, shows excellent heat resistant and has a low viscosity and good ease of handling, a synthetic resin composition and a molded article using the same.

Means for Solving the Problems

That is, the stabilizer composition according to the present invention is a stabilizer composition comprising: a diester represented by the following Formula (1):

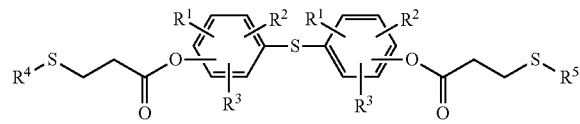

(wherein, $R^1$, $R^2$ and $R^3$ each independently represent a hydrogen atom, an alkyl group having 1 to 18 carbon atoms, a cycloalkyl group having 3 to 18 carbon atoms, or an aryl group having 6 to 30 carbon atoms which is optionally substituted with an alkyl group, an alkoxy group, an alkenyl group, an alkenyloxy group or a hydroxyl group; and $R^4$ and $R^5$ each independently represent a linear or branched alkyl group having 3 to 30 carbon atoms which is optionally substituted with an alkoxy group, an alkenyl group, an alkenyloxy group, a hydroxyl group or a cyano group); and a monoester represented by the following Formula (2):

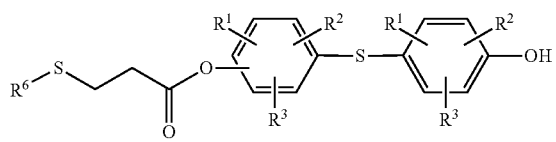

(wherein, $R^1$, $R^2$ and $R^3$ each independently represent a hydrogen atom, an alkyl group having 1 to 18 carbon atoms, a cycloalkyl group having 3 to 18 carbon atoms, or an aryl group having 6 to 30 carbon atoms which is optionally substituted with an alkyl group, an alkoxy group, an alkenyl group, an alkenyloxy group or a hydroxyl group; and $R^6$ represents a linear or branched alkyl group having 3 to 30 carbon atoms which is optionally substituted with an alkoxy group, an alkenyl group, an alkenyloxy group, a hydroxyl group or a cyano group), wherein the content of the diester represented by the Formula (1) is more than 65 parts by mass and less than 80 parts by mass in a total of 100 parts by mass of the diester represented by the Formula (1) and the monoester represented by the Formula (2).

It is preferred that the stabilizer composition of the present invention have a viscosity of 6,000 mPa·s or less. When charging the stabilizer composition of the present invention to a synthetic resin or the like using a pump, a known pump such as a gear pump, a diaphragm pump, a rotary pump, a screw pump, a Waukesha pump, a sine pump or a hose pump can be employed. If the viscosity of the stabilizer composition is higher than 6,000 mPa·s, a special pump may be required and the stabilizer composition may adhere to the inner walls of the pump and pipes to cause a loss; therefore, it is preferred that the viscosity of the stabilizer composition be 6,000 mPa·s or less. In order to control the stabilizer composition of the present invention to have a viscosity of 6,000 mPa·s or less, it is required to adjust the amount of the above-described diester represented by the Formula (1) and that of the above-described monoester represented by the Formula (2) to satisfy the above-described specific composition ratio.

In the stabilizer composition according to the present invention, it is preferred that all of $R^4$ and $R^5$ in the above-described Formula (1) and $R^6$ in the above-described Formula (2) be the same alkyl group.

The resin composition according to the present invention is characterized by comprising any of the above-described stabilizer compositions in a synthetic resin.

The molded article according to the present invention is characterized by being obtained by molding the above-described resin composition.

Further, the preset inventors intensively studied to solve the above-described problems and discovered that a heat stabilizer composition capable of solving the above-described problems can be obtained by mixing prescribed amounts of a diester compound, a monoester compound and a thiodialkyl carboxylic acid dialkyl ester compound, all of which each have a prescribed structure, thereby completing the present invention.

That is, the heat stabilizer composition according to the present invention is a heat stabilizer composition, comprising: a diester compound represented by the following Formula (3):

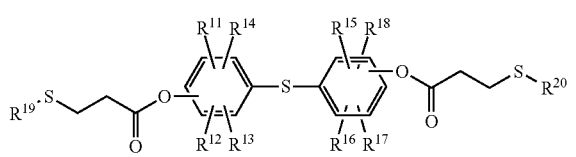

(3)

(wherein, $R^{11}$ to $R^{18}$ each independently represent a hydrogen atom, an alkyl group having 1 to 18 carbon atoms which is optionally interrupted by an oxygen atom or a sulfur atom, a cycloalkyl group having 3 to 18 carbon atoms, or an aryl group having 6 to 30 carbon atoms which is optionally interrupted by an oxygen atom or a sulfur atom and optionally substituted with an alkyl group, an alkoxy group, an alkenyl group, an alkenyloxy group or a hydroxyl group; and $R^{19}$ and $R^{20}$ each independently represent a linear or branched alkyl group having 3 to 30 carbon atoms which is optionally substituted with an alkoxy group, an alkenyl group, an alkenyloxy group, a hydroxyl group or a cyano group and optionally interrupted by an oxygen atom or a sulfur atom);

a monoester compound represented by the following Formula (4):

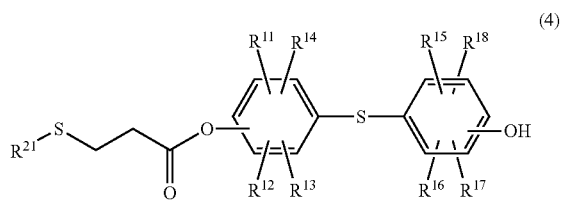

(4)

(wherein, $R^{11}$ to $R^{18}$ each independently represent a hydrogen atom, an alkyl group having 1 to 18 carbon atoms which is optionally interrupted by an oxygen atom or a sulfur atom, a cycloalkyl group having 3 to 18 carbon atoms, or an aryl group having 6 to 30 carbon atoms which is optionally interrupted by an oxygen atom or a sulfur atom and optionally substituted with an alkyl group, an alkoxy group, an alkenyl group, an alkenyloxy group or a hydroxyl group; and $R^{21}$ represents a linear or branched alkyl group having 3 to 30 carbon atoms which is optionally substituted with an alkoxy group, an alkenyl group, an alkenyloxy group, a hydroxyl group or a cyano group and optionally interrupted by an oxygen atom or a sulfur atom); and a thiodialkyl carboxylic acid dialkyl ester compound represented by the following Formula (5):

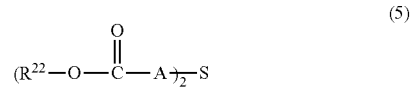

(5)

(wherein, $R^{22}$ represents a linear or branched alkyl group having 3 to 30 carbon atoms which is optionally substituted with an alkoxy group, an alkenyl group, an alkenyloxy group, a hydroxyl group or a cyano group and optionally interrupted by an oxygen atom or a sulfur atom; and A represents a linear or branched alkylene group having 1 to 8 carbon atoms which is optionally substituted with an alkoxy group, an alkenyl group, an alkenyloxy group, a hydroxyl group or a cyano group), wherein the content of the diester compound represented by the Formula (3) is more than 65 parts by mass in a total of 100 parts by mass of the diester compound represented by the Formula (3) and the monoester compound represented by the Formula (4) and the ratio between the total mass of the diester compound represented by the Formula (3) and the monoester compound represented by the Formula (4) and the mass of the thiodialkyl carboxylic acid dialkyl ester compound represented by the Formula (5), {(3)+(4)}/(5), is in the range of 95/5 to 50/50.

It is preferred that the heat stabilizer composition of the present invention have a viscosity of 3,000 mPa·s or less at 25° C. In addition, in the heat stabilizer composition of the present invention, it is preferred that, when it is heated under a nitrogen atmosphere at a heating rate of 10° C./min from room temperature, the temperature at which the mass is reduced by 5%, which is determined by differential thermal analysis (TG-DTA), be 240° C. or higher.

Further, the synthetic resin composition according to the present invention is characterized by comprising 0.01 to 5 parts by mass of the above-described heat stabilizer composition of the present invention with respect to 100 parts by mass of a synthetic resin.

In synthetic resin composition of the present invention, it is preferred that the above-described synthetic resin be a polyolefin resin.

Still further, the molded article according to the present invention is characterized by being obtained by molding the above-described synthetic resin composition of the present invention.

Effects of the Invention

According to the present invention, the followings can be provided: a stabilizer composition which has good ease of handling without causing precipitation of solids even in low temperature environments, a resin composition and a molded article using the same, as well as a stabilizer composition for synthetic resins which contains no solid, shows excellent heat resistant and has a low viscosity and good ease of handling, a synthetic resin composition and a molded article using the same.

MODE FOR CARRYING OUT THE INVENTION

First, the stabilizer composition according to the present invention which has good ease of handling without causing precipitation of solids even in low temperature environments will be described in detail.

The stabilizer composition of the present invention comprises an alkylmercapto carboxylic acid diester of bisphenol sulfide represented by the above-described Formula (1) and an alkylmercapto carboxylic acid monoester of bisphenol sulfide represented by the above-described Formula (2) and is characterized in that the content of the compound represented by the Formula (1) is more than 65 parts by mass and less than 80 parts by mass with respect to a total of 100 parts by mass of the compounds represented by the Formulae (1) and (2). The stabilizer composition of the present invention is in the form of a liquid having good ease of handling and a low viscosity and even if it is stored in a low temperature environment, for example, at a temperature of 5° C., precipitation of solid is inhibited. The viscosity is preferably 6,000 mPa·s or less. The viscosity is measured at 25° C. using, for example, a B-type viscometer.

The stabilizer composition of the present invention preferably consists essentially of a diester represented by the above-described Formula (1) and a monoester represented by the above-described Formula (2); however, as long as the effects of the present invention are not adversely affected, the stabilizer composition of the present invention may also contain other component(s) such as the below-described additives that are generally used in resins. Even when the stabilizer composition of the present invention contains other component(s), the main components thereof are still compounds represented by the above-described Formulae (1) and (2), and the content of other component(s) is preferably 1,000 parts by mass or less with respect to a total of 100 parts by mass of the diester represented by the Formula (1) and the monoester represented by the Formula (2).

Examples of the linear or branched alkyl group having 3 to 30 carbon atoms which is optionally substituted and represented by $R^4$ and $R^5$ in the above-described Formula (1) and $R^6$ in the above-described Formula (2) include a propyl group, an isopropyl group, a butyl group, an isobutyl group, a t-butyl group, a s-butyl group, a pentyl group, an isopentyl group, a neopentyl group, a hexyl group, a 2-ethylhexyl group, an isohexyl group, a heptyl group, an octyl group, an isooctyl group, a nonyl group, a decyl group, an isodecyl group, a lauryl group, a tetradecyl group, a hexadecyl group, a tridecyl group, a tetradecyl group, a pentadecyl group, a hexadecyl group, a heptadecyl group, an octadecyl group, an eicosyl group, a tetracosyl group and an octacosyl group.

The above-described alkyl group is optionally substituted with an alkenyl group, an alkenyloxy group, a hydroxyl group or a cyano group and is also optionally interrupted by an oxygen atom or a sulfur atom. Further, these interruptions or substitutions may also exist in combination. A compound in which the alkyl group has less than 3 carbon atoms may bleed out to the surface of the resulting molded article and/or cause fogging to impair the outer appearance of the molded article. When the alkyl group has more than 30 carbon atoms, the required stabilization effect may not be attained. In the present invention, a stabilizer composition comprising a compound in which all of $R^4$, $R^5$ and $R^6$ are the same alkyl group is preferably used because it has a relatively low viscosity and shows good thermostability.

Examples of the alkyl group having 1 to 18 carbon atoms which is represented by $R^1$, $R^2$ and $R^3$ in the above-described Formulae (1) and (2) include the same ones as those exemplified for the above-described alkyl group.

Examples of the cycloalkyl group having 3 to 18 carbon atoms which is represented by $R^1$, $R^2$ and $R^3$ in the above-described Formulae (1) and (2) include a cyclopropyl group, a cyclopentyl group, a cyclohexyl group, a cycloheptyl group, a cyclooctyl group, a cyclononyl group and a cyclodecyl group. The hydrogen atoms of the cycloalkyl group are optionally substituted with an alkyl group, an alkenyl group, an alkenyloxy group, a hydroxyl group or a cyano group, and the alkyl group is also optionally interrupted by an oxygen atom or a sulfur atom. Examples of such cycloalkyl group include cyclopentyl, cyclohexyl, cyclooctyl, cyclododecyl and 4-methylcyclohexyl.

Examples of the aryl group having 6 to 30 carbon atoms which is optionally substituted with an alkyl group, an alkoxy group, an alkenyl group, an alkenyloxy group or a hydroxyl group and represented by $R^1$, $R^2$ and $R^3$ in the above-described Formulae (1) and (2) include a phenyl group, a methylphenyl group, a butylphenyl group, an octylphenyl group, a 4-hydroxyphenyl group, a 3,4,5-trimethoxyphenyl group, a 4-t-butylphenyl group, a biphenyl group, a naphthyl group, a methylnaphthyl group, an anthracenyl group, a phenanthryl group, a benzyl group, a phenylethyl group and a 1-phenyl-1-methylethyl group. Further, the hydrogen atoms of the aryl group are optionally substituted with an alkyl group, an alkenyl group, an alkenyloxy group, a hydroxyl group or a cyano group, and the alkyl group is also optionally interrupted by an oxygen atom or a sulfur atom.

The above-described diester represented by the Formula (1) is preferably a compound represented by the following Formula (1'):

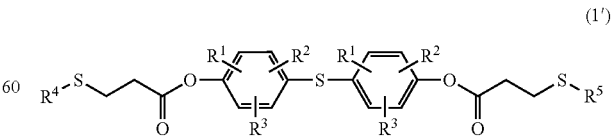

(wherein, $R^1$ to $R^5$ each represent the same groups as in the Formula (1)).

Further, the above-described monoester represented by the Formula (2) is preferably a compound represented by the following Formula (2'):

(2')

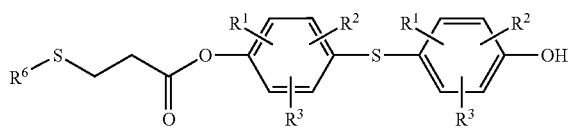

(wherein, $R^1$ to $R^3$ and $R^6$ each represent the same groups as in the Formula (2)).

Specific examples of the structure of the compound represented by the above-described Formula (1) include those of the following compounds. However, the present invention is not restricted to the following compounds by any means.

Compound No. 1-1

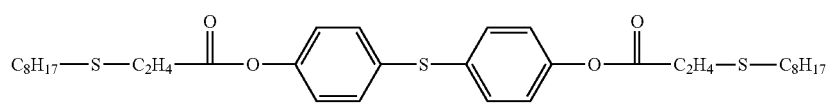

Compound No. 1-2

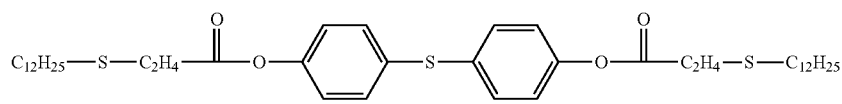

Compound No. 1-3

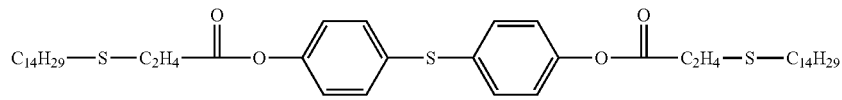

Compound No. 1-4

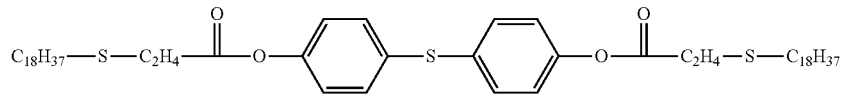

Compound No. 1-5

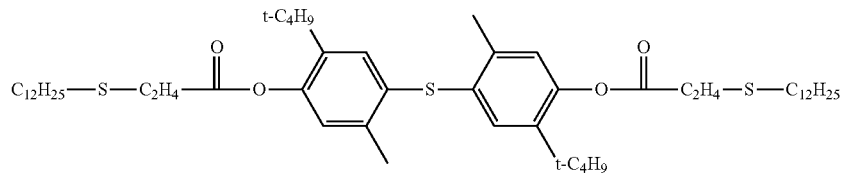

Compound No. 1-6

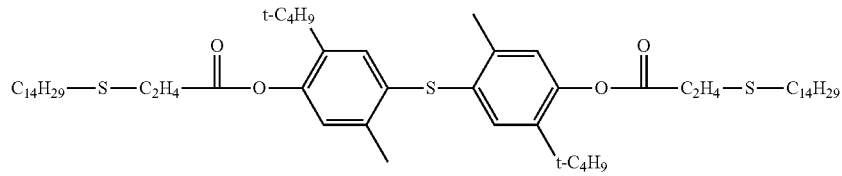

Compound No. 1-7

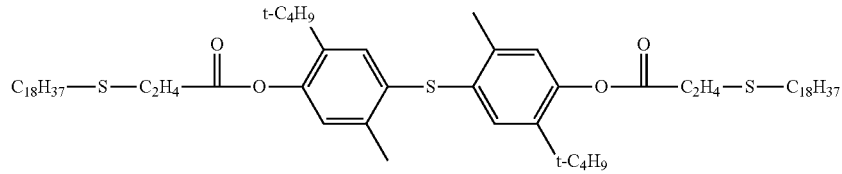

Compound No. 1-8

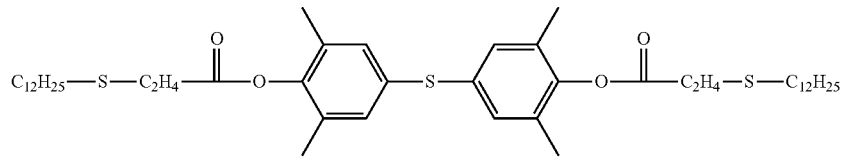

Compound No. 1-9
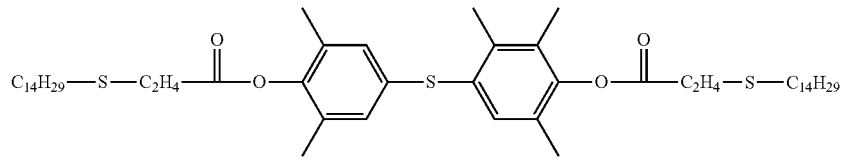
Compound No. 1-10
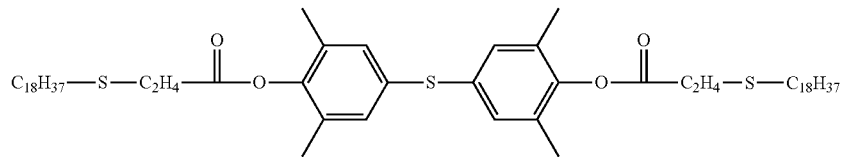
Compound No. 1-11
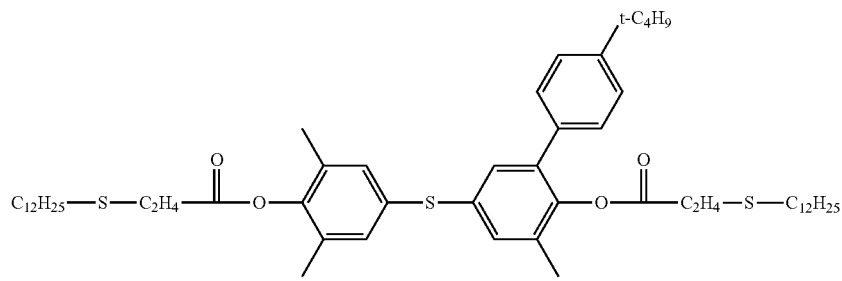
Compound No. 1-12
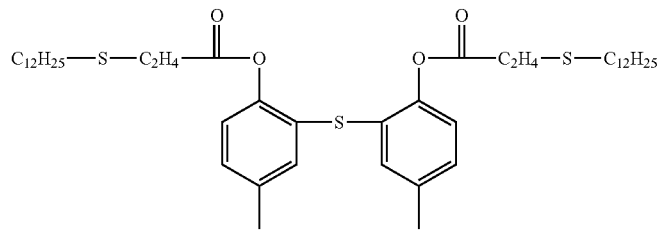
Compound No. 1-13
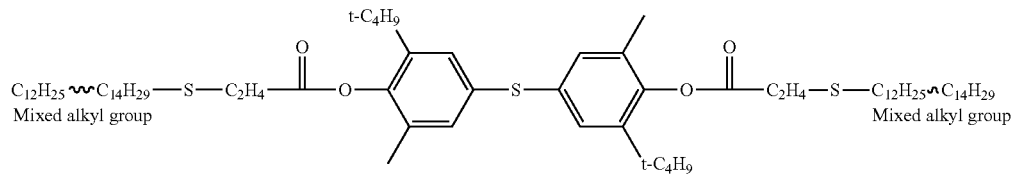
Specific examples of the structure of the compound represented by the above-described Formula (2) include those of the following compounds. However, the present invention is not restricted to the following compounds by any means.
Compound No. 2-1
Compound No. 2-2
Compound No. 2-3
Compound No. 2-4
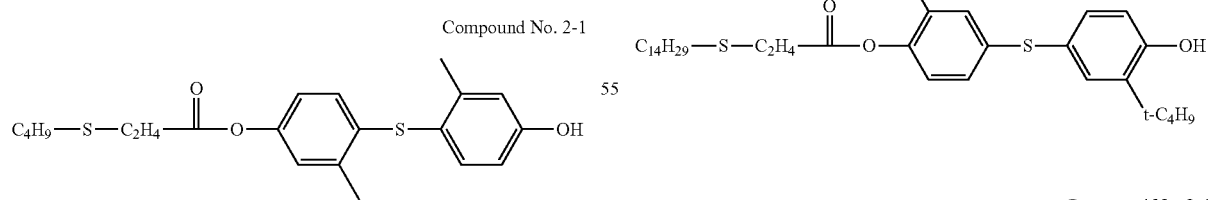
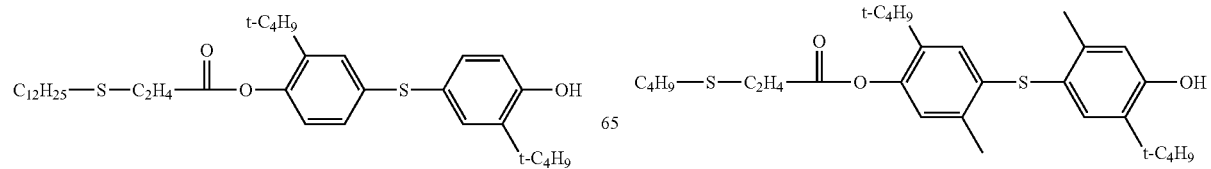

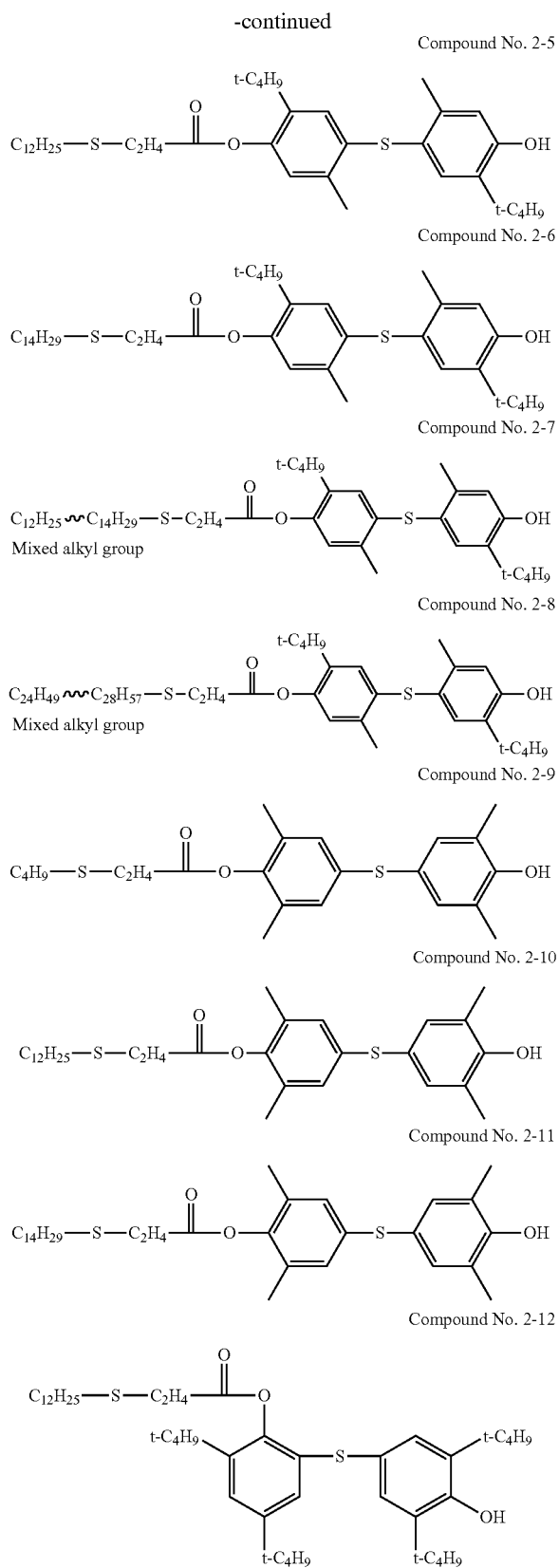

Examples of a synthetic resin stabilized by the stabilizer composition of the present invention include α-olefin polymers and ethylene-vinyl acetate copolymers, such as polypropylenes, high-density polyethylenes, low-density polyethylenes, linear low-density polyethylenes, polybutene-1 and poly-4-methylpentene; polyolefins and copolymers thereof, such as ethylene-propylene copolymers; halogen-containing resins, such as polyvinyl chloride, polyvinylidene chloride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers and vinyl chloride-cyclohexylmaleimide copolymers; petroleum resins; coumarone resins; polystyrenes; polyvinyl acetates; acrylic resins; copolymers (e.g., AS resins, ABS resins, MBS resins and heat-resistant ABS resins) that are composed of styrene and/or α-methylstyrene with other monomer (e.g., maleic anhydride, phenyl maleimide, methyl methacrylate, butadiene or acrylonitrile); linear polyesters such as polymethyl methacrylate, polyvinyl alcohol, polyvinyl formal, polyvinyl butyral, polyethylene terephthalate, polybutyl terephthalate and polytetramethyl terephthalate; polyamides such as polyphenylene oxide, polycaprolactam and polyhexamethylene adipamide; thermoplastic resins, such as polycarbonate, branched polycarbonate, polyacetal, polyphenylene sulfide, polyurethane and cellulose-based resins, and mixtures thereof; and thermosetting resins such as phenol resins, urea resins, melamine resins, epoxy resins and unsaturated polyester resins. Further, the synthetic resin may also be an elastomer such as an isoprene rubber, a butadiene rubber, an acrylonitrile-butadiene copolymer rubber or a styrene-butadiene copolymer rubber, or the above-described resin containing such an elastomer. Moreover, the stabilizer composition of the present invention can also be preferably used in a synthetic resin to be crosslinked that is produced using peroxide, radiation or the like, or in a formed resin such as foamed polystyrene. Examples of the synthetic resin for crosslinking include polyethylenes as well as copolymers such as ethylene-vinyl acetate, ethylene-ethyl acrylate, ethylene-propylene and ethylene-propylene-butadiene.

Further, examples of a cross-linking agent that can be used in the synthetic resin include benzoyl peroxide, di-t-butyl peroxide, dicumyl peroxide, 2,5-dimethyl-2,5-di(t-butylperoxy)hexane, 2,5-dimethyl-2,5-di(t-butylperoxy)hexyne, 1,3-bis(t-butylperoxyisopropyl)benzene, t-butyl hydroperoxide, cumene hydroperoxide, polysulfone azide, azidoformate, tetramethylisophthalyl di-t-butyl bisperoxide, tetramethylisophthalyl dicumyl bisperoxide, alkanolamines such as diethanolamine and triethanolamine, hexamethylene diamine, and 4,4'-diaminodiphenylmethane.

Among the above-described synthetic resins, polyolefin-based resins such as polyethylene, polypropylene and ethylene-propylene copolymer resins are preferably used because the stabilizer composition of the present invention exhibits excellent stabilization effect against these synthetic resins. That is, the stabilizer composition of the present invention is suitable as a stabilizer for polyolefin-based resins.

As described above, in the stabilizer composition of the present invention, a component(s) other than the compounds represented by the above-described Formulae (1) and (2) may be incorporated as well. Examples of such other component include additives that are normally used in a synthetic resin. Alternatively, other component(s) may be added to a resin composition to which the stabilizer composition of the present invention is to be added. Examples of the additives include a phenolic antioxidant, a phosphorus-based antioxidant, a thioether-based antioxidant, an ultraviolet absorber, a hindered amine compound, a flame retardant, a nucleating agent, a filler, a lubricant, an antistatic agent, a heavy metal inactivator, a metallic soap, hydrotalcite, a pigment, a dye and a plasticizer.

The above-described phenolic antioxidant may be the same as or different from the one represented by the above-described Formula (1). Examples of the phenolic antioxidant include 2,6-di-t-butyl-4-ethylphenol, 2-t-butyl-4,6-dimethylphenol, styrenated phenol, 2,2'-methylenebis(4-ethyl-6-t-butylphenol), 2,2'-thiobis-(6-t-butyl-4-methylphenol), 2,2'-thiodiethylenebis[3-(3,5-di-t-butyl-4-hydroxyphenyl)propionate], 2-methyl-4,6-bis(octylsulfanylmethyl)phenol, 2,2'-isobutylidenebis(4,6-dimethylphenol), iso-octyl-3-(3,5-di-t-butyl-4-hydroxyphenyl)propionate, N,N'-hexane-1,6-diylbis[3-(3,5-di-t-butyl-4-hydroxyphenyl)propionamide, 2,2'-oxamide-bis[ethyl-3-(3,5-di-t-butyl-4-hydroxyphenyl)propionate], 2-ethylhexyl-3-(3',5'-di-t-butyl-4'-hydroxyphenyl)propionate, 2,2'-ethylenebis(4,6-di-t-butylphenol), 3,5-bis(1,1-dimethylethyl)-4-hydroxy-benzenepropanoate, C13-15 alkyl esters, 2,5-di-t-amylhydroquinone, hindered phenol polymer (AO.OH998, manufactured by ADEKA Palmarole SAS), 2,2'-methylenebis[6-(1-methylcyclohexyl)-p-cresol], 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 6-[3-(3-t-butyl-4-hydroxy-5-methyl)propoxy]-2,4,8,10-tetra-t-butylbenzo[d,f][1,3,2]-dioxaphosphepin, hexamethylene-bis[3-(3,5-di-t-butyl-4-hydroxyphenyl)propionate, calcium bis[monoethyl (3,5-di-t-butyl-4-hydroxybenzyl)phosphonate, a reaction product between 5,7-bis(1,1-dimethylethyl)-3-hydroxy-2 (3H)-benzofuranone and o-xylene, 2,6-di-t-butyl-4-(4,6-bis(octylthio)-1,3,5-triazine-2-ylamino)phenol, DL-a-tocophenol (vitamin E), 2,6-bis(α-methylbenzyl)-4-methylphenol, bis[3,3-bis-(4'-hydroxy-3'-t-butyl-phenyl)butyric acid]glycol ester, 2,6-di-t-butyl-p-cresol, 2,6-diphenyl-4-octadecyloxyphenol, stearyl(3,5-di-t-butyl-4-hydroxyphenyl)propionate, distearyl(3,5-di-t-butyl-4-hydroxybenzyl)phosphonate, tridecyl-3,5-di-t-butyl-4-hydroxybenzyl thioacetate, thiodiethylenebis[(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6-t-butylphenol), bis[3,3-bis(4-hydroxy-3-t-butylphenyl)butyric acid]glycol ester, 4,4'-butylidenebis(2,6-di-t-butylphenol), 4,4'-butylidenebis(6-t-butyl-3-methylphenol), 2,2'-ethylidenebis(4,6-di-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl]terephthalate, 1,3,5-tris(2,6-dimethyl-3-hydroxy-4-t-butylbenzyl)isocyanurate, 1,3,5-tris (3,5-di-t-butyl-4-hydroxybenzyl)isocyanurate, 1,3,5-tris(3, 5-di-t-butyl-4-hydroxybenzyl)-2,4,6-trimethylbenzene, 1,3, 5-tris[(3,5-di-t-butyl-4-hydroxyphenyl)propionyloxyethyl] isocyanurate, tetrakis[methylene-3-(3',5'-di-t-butyl-4'-hydroxyphenyl)propionate]methane, 2-t-butyl-4-methyl-6-(2-acryloyloxy-3-t-butyl-5-methylbenzyl)phenol, 3,9-bis[2-(3-t-butyl-4-hydroxy-5-methylhydrocinnamoyloxy)-1,1-dimethylethyl]-2,4,8,10-tetraoxaspiro[5.5]undecane, triethylene glycol-bis[β-(3-t-butyl-4-hydroxy-5-methylphenyl)propionate] and phenolic antioxidants represented by the above-described Formula (1). Particularly, tetrakis[methylene-3-(3',5'-di-t-butyl-4'-hydroxyphenyl)propionate]methane is preferably used since it is relatively inexpensive and has good cost performance.

Examples of the above-described phosphorus-based antioxidant include triphenyl phosphite, diisooctyl phosphite, heptakis triphosphite, triisodecyl phosphite, diphenyl isooctyl phosphite, diisooctyl phenyl phosphite, diphenyl tridecyl phosphite, triisooctyl phosphite, trilauryl phosphite, diphenyl phosphite, tris(dipropylene glycol)phosphite, diisodecyl pentaerythritol diphosphite, dioleyl hydrogen phosphite, trilauryl trithiophosphite, bis(tridecyl)phosphite, tris(isodecyl) phosphite, tris(tridecyl)phosphite, diphenyldecyl phosphite, dinonylphenyl-bis(nonylphenyl)phosphite, poly(dipropylene glycol)phenyl phosphite, tetraphenyldipropyl glycol diphosphite, trisnonylphenyl phosphite, tris(2,4-di-t-butylphenyl)phosphite, tris(2,4-di-t-butyl-5-methylphenyl) phosphite, tris[2-t-butyl-4-(3-t-butyl-4-hydroxy-5-methylphenylthio)-5-methylphenyl]phosphite, tridecyl phosphite, octyldiphenyl phosphite, di(decyl)monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl)pentaerythritol diphosphite, bis(2,4-di-t-butylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, bis(2,4-dicumylphenyl)pentaerythritol diphosphite, tetraphenyl-tetra(tridecyl)pentaerythritol tetraphosphite, bis(2,4-di-t-butyl-6-methylphenyl)ethyl phosphite, tetra(tridecyl) isopropylidene diphenol diphosphite, tetra(tridecyl)-4,4'-n-butylidenebis(2-t-butyl-5-methylphenol)diphosphite, hexa (tridecyl)-1,1,3-tris(2-methyl-4-hydroxy-5-t-butylphenyl) butane triphosphite, tetrakis(2,4-di-t-butylphenyl) biphenylene diphosphonite, 9,10-dihydro-9-oxa-10-phosphaphenanthrene-10-oxide, (1-methyl-1-propanyl-3-ylidene)-tris(2-1,1-dimethylethyl)-5-methyl-4,1-phenylene) hexamidecyl phosphite, 2,2'-methylenebis(4,6-t-butylphenyl)-2-ethylhexyl phosphite, 2,2'-methylenebis(4,6-di-t-butylphenyl)-octadecyl phosphite, 2,2'-ethylidenebis(4, 6-di-t-butylphenyl)fluorophosphite, 4,4'-butylidenebis(3-methyl-6-t-butylphenylditridecyl)phosphite, tris(2-[(2,4,8, 10-tetrakis-t-butyldibenzo[d,f][1,3,2]dioxaphosphepin-6-yl) oxy]ethyl)amine, 3,9-bis(4-nonylphenoxy)-2,4,8,10-tetraoxa-3,9-diphosphaspiro[5,5]undecane, 2,4,6-tri-t-butylphenyl-2-butyl-2-ethyl-1,3-propanediol phosphite, poly-4,4'-isopropylidene diphenol C12-15 alcohol phosphite, and phosphite of 2-ethyl-2-butylpropylene glycol and 2,4,6-tri-t-butylphenol.

Examples of the above-described thioether-based antioxidant include tetrakis[methylene-3-(laurylthio)propionate] methane, bis(methyl-4-[3-n-alkyl(C12/C14)thiopropionyloxy]-5-t-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-t-butyl-m-cresol), 2,2'-thiobis(6-t-butyl-p-cresol) and distearyl disulfide.

Examples of the above-described ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2-hydroxyphenyl) benzotriazoles such as 2-(2-hydroxy-5-methylphenyl) benzotriazole, 2-(2-hydroxy-5-t-octylphenyl)benzotriazole, 2-(2-hydroxy-3,5-di-t-butylphenyl)-5-chlorobenzotriazole, 2-(2-hydroxy-3-t-butyl-5-methylphenyl)-5-chlorobenzotriazole, 2-(2-hydroxy-3,5-dicumylphenyl)benzotriazole, 2,2'-methylenebis(4-t-octyl-6-benzotriazolylphenol), polyethylene glycol ester of 2-(2-hydroxy-3-t-butyl-5-carboxyphenyl) benzotriazole, 2-[2-hydroxy-3-(2-acryloyloxyethyl)-5-methylphenyl]benzotriazole, 2-[2-hydroxy-3-(2-methacryloyloxyethyl)-5-t-butylphenyl]benzotriazole, 2-[2-hydroxy-3-(2-methacryloyloxyethyl)-5-t-octylphenyl] benzotriazole, 2-[2-hydroxy-3-(2-methacryloyloxyethyl)-5-t-butylphenyl]-5-chlorobenzotriazole, 2-[2-hydroxy-5-(2-methacryloyloxyethyl)phenyl]benzotriazole, 2-[2-hydroxy- 3-t-butyl-5-(2-methacryloyloxyethyl)phenyl]benzotriazole, 2-[2-hydroxy-3-t-amyl-5-(2-methacryloyloxyethyl)phenyl] benzotriazole, 2-[2-hydroxy-3-t-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-t-butylphenyl-3, 5-di-t-butyl-4-hydroxybenzoate, octyl(3,5-di-t-butyl-4-hydroxy)benzoate, dodecyl(3,5-di-t-butyl-4-hydroxy)benzoate, tetradecyl(3,5-di-t-butyl-4-hydroxy)benzoate, hexadecyl(3,5-di-t-butyl-4-hydroxy)benzoate, octadecyl(3, 5-di-t-butyl-4-hydroxy)benzoate and behenyl(3,5-di-t-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and various metal salts and metal chelates, particularly salts and chelates of nickel and chromium.

Examples of the above-described hindered amine compound include 2,2,6,6-tetramethyl-4-piperidyl stearate, 1,2, 2,6,6-pentamethyl-4-piperidyl stearate, 2,2,6,6-tetramethyl-4-piperidyl benzoate, bis(2,2,6,6-tetramethyl-4-piperidyl) sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)•di(tridecyl)-1,2,3,4-butane tetracarboxylate, bis(1,2,2,6,6-pentamethyl-4-piperidyl)•di (tridecyl)-1,2,3,4-butane tetracarboxylate, bis(1,2,2,4,4-pentamethyl-4-piperidyl)-2-butyl-2-(3,5-di-t-butyl-4-hydroxybenzyl)malonate, 1-(2-hydroxyethyl)-2,2,6,6-tetramethyl-4-piperidinol/diethyl succinate polycondensate, 1,6-bis(2,2,6, 6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-t-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis [2,4-bis(N-butyl-N-(1,2,2,6,6-pentamethyl-4-piperidyl) amino)-s-triazine-6-yl]-1,5,8,12-tetraazadodecane, 1,6,11-tris[2,4-bis(N-butyl-N-(2,2,6,6-tetramethyl-4-piperidyl) amino)-s-triazine-6-yl]aminoundecane, 1,6,11-tris[2,4-bis (N-butyl-N-(1,2,2,6,6-pentamethyl-4-piperidyl)amino)-s-triazine-6-yl]aminoundecane, bis{4-(1-octyloxy-2,2,6,6-tetramethyl)piperidyl}decanedionate and bis{4-(2,2,6,6-tetramethyl-1-undecyloxy)piperidyl}carbonate.
Thereamong, compounds in which the group linked to the 1-position of piperidine is N-oxyalkyl or N-methyl are preferred.

Examples of the above-described flame retardant include aromatic phosphates such as triphenyl phosphate, tricresyl phosphate, trixylenyl phosphate, cresyldiphenyl phosphate, cresyl-2,6-xylenyl phosphate and resorcinol-bis(diphenylphosphate); phosphonates such as divinyl phenylphosphonate, diallyl phenylphosphonate and (1-butenyl)phenylphosphonate; phosphinates such as phenyl diphenylphosphinate, methyl diphenylphosphinate and 9,10-dihydro-9-oxa-10-phosphaphenanthlene-10-oxide derivatives; phosphazene compounds such as bis(2-allylphenoxy) phosphazene and dicresylphosphazene; phosphorus-based flame retardants such as melamine phosphate, melamine pyrophosphate, melamine polyphosphate, melam polyphosphate, ammonium polyphosphate, phosphorus-containing vinylbenzyl compounds and red phosphorus; metal hydroxides such as magnesium hydroxide and aluminum hydroxide; and bromine-based flame retardants such as brominated bisphenol A-type epoxy resin, brominated phenol novolactype epoxy resin, hexabromobenzene, pentabromotoluene, ethylenebis(pentabromophenyl), ethylenebis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate and brominated styrene.

Examples of the above-described nucleating agent include metal carboxylates such as sodium benzoate, aluminum-4-t-butylbenzoate, sodium adipate and 2-sodium-bicyclo[2.2.1] heptane-2,3-dicarboxylate; metal phosphates such as sodium-bis(4-t-butylphenyl)phosphate, sodium-2,2'-methylenebis(4,6-di-t-butylphenyl)phosphate and lithium-2,2'-methylenebis(4,6-di-t-butylphenyl)phosphate; polyhydric alcohol derivatives such as dibenzylidene sorbitol, bis (methylbenzylidene)sorbitol, bis(p-ethylbenzylidene) sorbitol and bis(dimethylbenzylidene)sorbitol; and amide compounds such as N,N',N"-tris[2-methylcyclohexyl]-1,2,3-propane tricarboxamide (RIKACLEAR PC1), N,N',N"-tricyclohexyl-1,3,5-benzene tricarboxamide, N,N'-dicyclohexyl-naphthalene dicarboxamide and 1,3,5-tri (dimethylisopropoylamino)benzene.

Preferred examples of the above-described filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, silica, alumina, potassium titanate whiskers, wollastonite and fibrous magnesium oxysulfate. Thereamong, fillers having an average particle size (in the case of a spherical or plate-form filler) or an average fiber diameter (in the case of a needle-form or fibrous filler) of 5 μm or less are preferred.

The above-described lubricant is added for the purpose of imparting the surface of the resulting molded article with lubricity and improving the damage-preventing effect. Examples of such lubricant include unsaturated fatty acid amides such as oleic acid amide and erucic acid amide; and saturated fatty acid amides such as behenic acid amide and stearic acid amide. These lubricants may be used individually, or two or more thereof may be used in combination.

The above-described antistatic agent is added for the purpose of reducing the electrostaticity of the resulting molded article and preventing adhesion of dusts caused by electrostatic charge. Examples of such antistatic agent include cationic, anionic and non-ionic antistatic agents. Preferred examples thereof include polyoxyethylene alkylamines, polyoxyethylene alkylamides, fatty acid esters thereof, and glycerin fatty acid esters.

The amount of such additive(s) to be used in the present invention is preferably in the range of from an amount at which the effects of adding the additive(s) are exerted to an amount at which an improvement in the effects of the addition is no longer observed. The preferred amounts of the respective additives to be used per 100 parts by mass of a synthetic resin are as follows: 0.1 to 20 parts by mass of plasticizer, 1 to 50 parts by mass of filler, 0.001 to 1 part by mass of surface treatment agent, 0.001 to 10 parts by mass of phenolic antioxidant, 0.001 to 10 parts by mass of phosphorus-based antioxidant, 0.001 to 10 parts by mass of thioether-based antioxidant, 0.001 to 5 parts by mass of ultraviolet absorber, 0.01 to 1 part by mass of hindered amine compound, 1 to 50 parts by mass of flame retardant, 0.03 to 2 parts by mass of lubricant, 0.03 to 2 parts by mass of antistatic agent, and 0.01 to 10 part by mass of nucleating agent. It is noted here that these additives may be used individually, or two or more thereof may be used in combination.

The resin composition according to the present invention is characterized by comprising the above-described stabilizer composition of the present invention in the above-described synthetic resin. The amount of the stabilizer composition of the present invention to be contained is preferably 0.01 to 5.0 parts by mass, more preferably 0.1 to 1.0 part by mass, with respect to 100 parts by mass of the synthetic resin.

Further, the molded article according to the present invention is obtained by molding the resin composition of the present invention by a known molding method such as extrusion molding, injection molding, hollow molding or compression molding. Examples of the applications and modes in which the molded article of the present invention can be used include interior and exterior components of automobiles; food containers; cosmetic and clothing containers; bottles such as food bottles, beverage bottles, cooking oil bottles and seasoning bottles; packaging materials such as food packaging materials, wrapping materials and transport packaging materials; sheets and films, such as protection films of electronic materials and protection sheets of electric appliances; fibers; miscellaneous daily goods; and toys.

Next, the heat stabilizer composition for a synthetic resin according to the present invention, which contains no solid, exhibits excellent heat resistance and has a low viscosity and good ease of handling, will be described in detail.

The heat stabilizer composition of the present invention comprises a diester compound represented by the following Formula (3), a monoester compound represented by the following Formula (4) and a thiodialkyl carboxylic acid dialkyl ester compound represented by the following Formula (5):

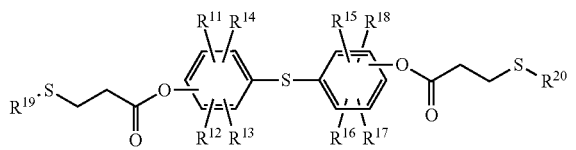

(3)

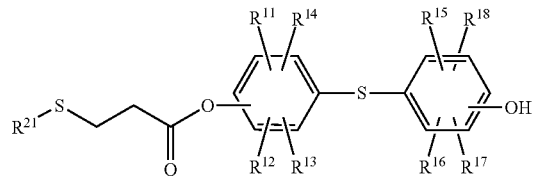

(4)

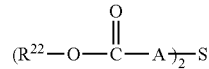

(5)

In the heat stabilizer composition of the present invention, the diester compound represented by the Formula (3) and the monoester compound represented by the Formula (4) are contained at such a ratio that the amount of the diester compound represented by the Formula (3) is not less than 65 parts by mass, preferably 70 to 90 parts by mass, more preferably 70 to 85 parts by mass, with respect to a total of 100 parts by mass of the diester compound represented by the Formula (3) and the monoester compound represented by the Formula (4). When the amount of the diester compound represented by the Formula (3) is less than 65 parts by mass, the viscosity of the heat stabilizer composition may be high.

Further, in heat stabilizer composition of the present invention, the ratio between the total mass of the diester compound represented by the Formula (3) and the monoester compound represented by the Formula (4) and the mass of the thiodialkyl carboxylic acid dialkyl ester compound represented by the Formula (5), $\{(3)+(4)\}/(5)$, is in the range of 95/5 to 50/50, preferably 90/10 to 70/30. This is because, when the ratio of the thiodicarboxylic acid dialkyl ester compound represented by the Formula (5) is lower than 5, the viscosity of the heat stabilizer composition may be high, while when it is higher than 50, the heat stabilizer composition may not have sufficient heat resistance.

The heat stabilizer composition of the present invention is in the form of a low-viscosity liquid which contains no solid and has good ease of handling, and the heat stabilizer composition of the present invention does not inhibit crosslinking of a synthetic resin to which it is added. The viscosity is preferably 3,000 mPa·s or less. When the viscosity is higher than 3,000 mPa·s, the pumps that can be used for delivery of the heat stabilizer composition are restricted and the ease of handling may thus be impaired. It is noted here that, in the present invention, the viscosity is measured at 25° C. using, for example, a B-type viscometer.

The heat stabilizer composition of the present invention preferably consists of a diester compound represented by the above-described Formula (3), a monoester compound represented by the above-described Formula (4) and a thiodialkyl carboxylic acid dialkyl ester compound represented by the above-described Formula (5); however, as long as the effects of the present invention are not adversely affected, the heat stabilizer composition of the present invention may also contain other component(s) such as those which are generally used in synthetic resins. Even when the heat stabilizer composition of the present invention contains other component(s), the main components thereof are still a diester compound represented by the above-described Formula (3), a monoester compound represented by the above-described Formula (4) and a thiodialkyl carboxylic acid dialkyl ester compound represented by the above-described Formula (5), and the content of other component(s) is preferably 1,000 parts by mass or less with respect to a total of 100 parts by mass of the diester compound represented by the Formula (3), the monoester compound represented by the Formula (4) and the thiodialkyl carboxylic acid dialkyl ester compound represented by the Formula (5).

Examples of the alkyl group having 1 to 18 carbon atoms which is represented by $R^{11}$ to $R^{18}$ in the above-described Formulae (3) and (4) include a methyl group, an ethyl group, a propyl group, an isopropyl group, a butyl group, an isobutyl group, a t-butyl group, a s-butyl group, a pentyl group, an isopentyl group, a neopentyl group, a hexyl group, a 2-ethylhexyl group, an isohexyl group, a heptyl group, an octyl group, an isooctyl group, a nonyl group, a decyl group, an isodecyl group, a lauryl group, a tridecyl group, a tetradecyl group, a hexadecyl group and an octadecyl group. The alkyl group is also optionally interrupted by an oxygen atom or a sulfur atom.

Examples of the cycloalkyl group having 3 to 18 carbon atoms which is represented by $R^{11}$ to $R^{18}$ in the above-described Formulae (3) and (4) include a cyclopropyl group, a cyclopentyl group, a cyclohexyl group, a cycloheptyl group, a cyclooctyl group, a cyclononyl group, a cyclodecyl group a cyclododecyl group and a 4-methylcyclohexyl group. The hydrogen atoms of the cycloalkyl group are optionally substituted with an alkyl group, an alkoxy group, an alkenyl group, an alkenyloxy group, a hydroxyl group or a cyano group, and the alkyl group is also optionally interrupted by an oxygen atom or a sulfur atom.

Examples of the aryl group having 6 to 30 carbon atoms which is optionally substituted with an alkyl group, an alkoxy group, an alkenyl group, an alkenyloxy group or a hydroxyl group and represented by $R^{11}$ to $R^{18}$ in the above-described Formulae (3) and (4) include a phenyl group, a methylphenyl group, a butylphenyl group, an octylphenyl group, a 4-hydroxyphenyl group, a 3,4,5-trimethoxyphenyl group, a 4-t-butylphenyl group, a biphenyl group, a naphthyl group, a methylnaphthyl group, an anthracenyl group, a phenanthryl group, a benzyl group, a phenylethyl group and a 1-phenyl-1-methylethyl group. Further, the hydrogen atoms of the aryl group are optionally substituted with an alkyl group, an alkenyl group, an alkenyloxy group, a hydroxyl group or a cyano group, and the alkyl group is also optionally interrupted by an oxygen atom or a sulfur atom.

Examples of the linear or branched alkyl group having 3 to 30 carbon atoms which is optionally substituted and represented by $R^{19}$ and $R^{20}$ in the Formula (3), $R^{21}$ in the Formula (4) and $R^{22}$ in the Formula (5) include a propyl group, an isopropyl group, a butyl group, an isobutyl group, a t-butyl group, a s-butyl group, a pentyl group, an isopentyl group, a neopentyl group, a hexyl group, a 2-ethylhexyl group, an isohexyl group, a heptyl group, an octyl group, an isooctyl group, a nonyl group, a decyl group, an isodecyl group, a lauryl group, a tridecyl group, a tetradecyl group, a hexadecyl group, an octadecyl group, an eicosyl group, a tetracosyl group and an octacosyl group.

The above-described alkyl group is optionally substituted with an alkoxy group, an alkenyl group, an alkenyloxy group, a hydroxyl group or a cyano group and is also optionally interrupted by an oxygen atom or a sulfur atom. Further, these interruptions or substitutions may also exist in combination. A compound in which the alkyl group has less than 3 carbon atoms may bleed out to the surface of the resulting molded article and/or cause fogging to impair the outer appearance of the molded article. When the alkyl group has more than 30 carbon atoms, the required stabilization effect may not be attained.

Examples of the linear or branched alkylene group having 1 to 8 carbon atoms which is optionally substituted with an alkoxy group, an alkenyl group, an alkenyloxy group, a hydroxyl group or a cyano group and represented by A in the above-described Formula (5) include a methylene group, an ethylene group, a propylene group, a propane-2,2-diyl group, a butylene group, an isobutylene group, a hexylene group and a heptylene group. The alkylene group is also optionally interrupted by an oxygen atom or a sulfur atom.

The above-described diester compound represented by the Formula (3) is preferably a compound represented by the following Formula (3'). In the Formula, $R^{11}$ to $R^{20}$ each represent the same groups as in the Formula (3).

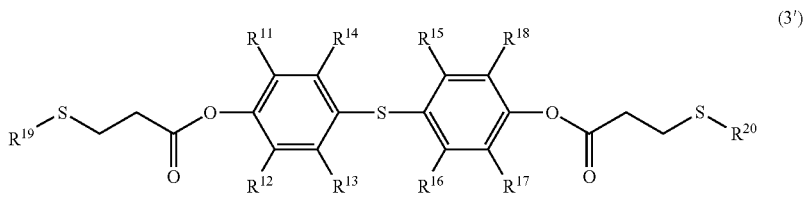

Further, the above-described monoester compound represented by the Formula (4) is preferably a compound represented by the following Formula (4'). In the Formula, $R^{11}$ to $R^{18}$ and $R^{21}$ each represent the same groups as in the Formula (4).

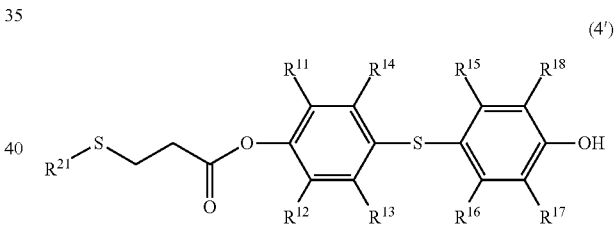

Further, the above-described thiodialkyl carboxylic acid dialkyl ester compound represented by the Formula (5) is preferably a compound represented by the following Formula (5'). In the Formula, $R^{22}$ represents the same group as in the Formula (5).

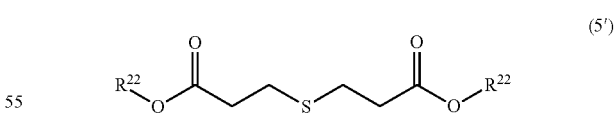

Specific examples of the structure of the above-described diester compound represented by the Formula (3) include those of the following compound Nos. 3-1 to 3-14. However, the present invention is not restricted to the following compounds by any means. Here, a compound represented by the Formula (3) wherein $R^{19}$ and $R^{20}$ are each a C12-14 mixed alkyl group represents a mixture of a compound in which $R^{19}$ and $R^{20}$ of the Formula (3) are alkyl groups having 12 carbon atoms and a compound in which $R^{19}$ and $R^{20}$ of Formula (3) are alkyl groups having 14 carbon atoms.

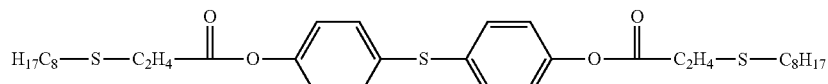
Compound No. 3-1
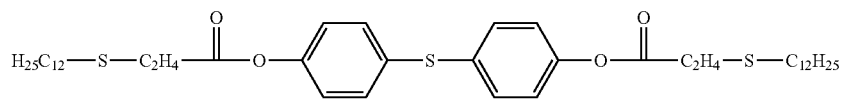
Compound No. 3-2
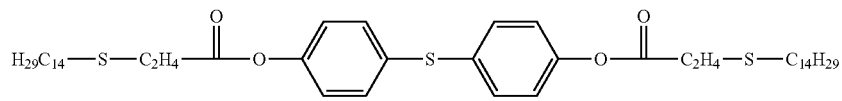
Compound No. 3-3
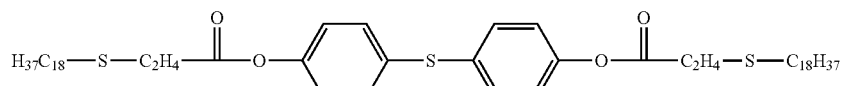
Compound No. 3-4
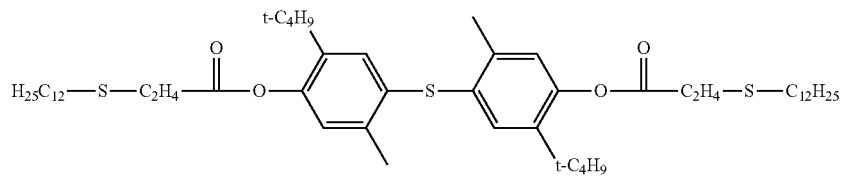
Compound No. 3-5
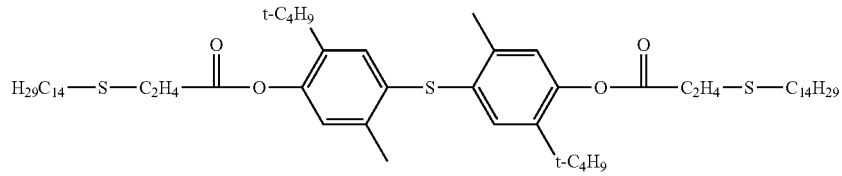
Compound No. 3-6
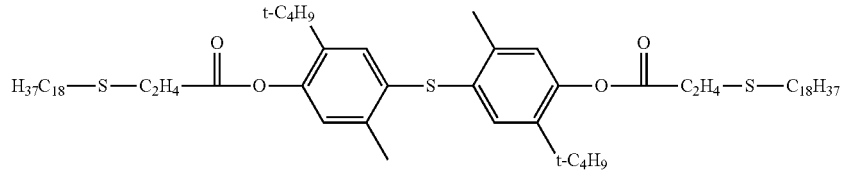
Compound No. 3-7
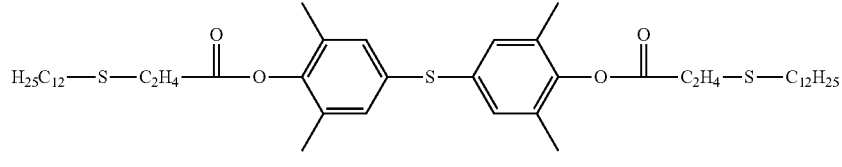
Compound No. 3-8
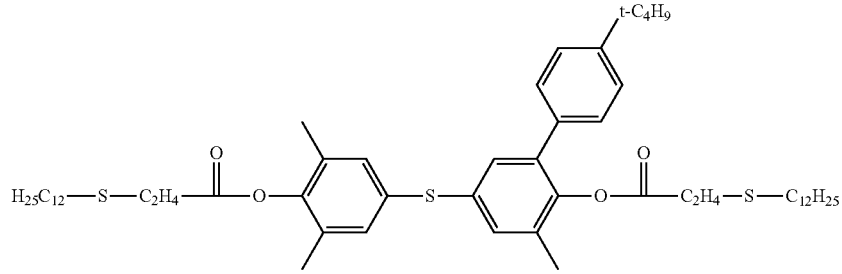
Compound No. 3-9

Compound No. 3-10

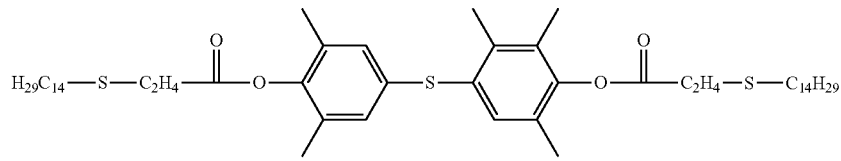

Compound No. 3-11

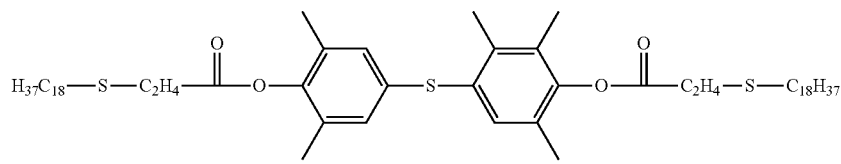

Compound No. 3-12

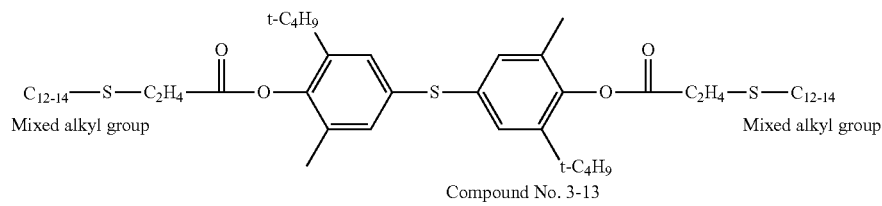

Compound No. 3-13

Compound No. 3-14

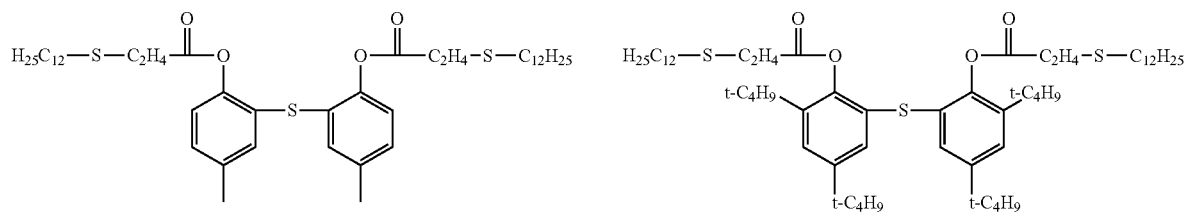

Specific examples of the structure of the above-described monoester compound represented by the Formula (4) include those of the following compound Nos. 4-1 to 4-13. However, the present invention is not restricted to the following compounds by any means. Here, a compound represented by the Formula (4) wherein $R^{21}$ is a C12-14 mixed alkyl group represents a mixture of a compound in which $R^{21}$ of the Formula (4) is an alkyl group having 12 carbon atoms and a compound in which $R^{21}$ of the Formula (4) is an alkyl group having 14 carbon atoms, and a compound represented by the Formula (4) wherein $R^{21}$ is a C24-28 mixed alkyl group represents a mixture of compounds in which $R^{21}$ of the Formula (4) is an alkyl group having 24 to 28 carbon atoms.

Compound No. 4-1

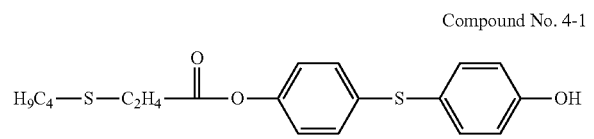

Compound No. 4-2

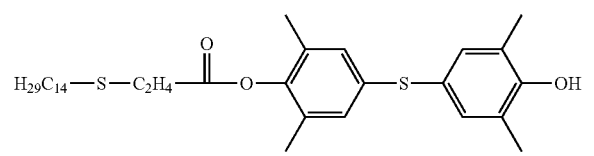

-continued

Compound No. 4-3

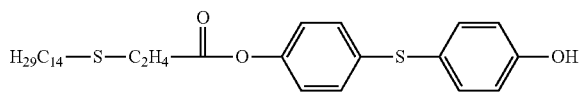

Compound No. 4-4

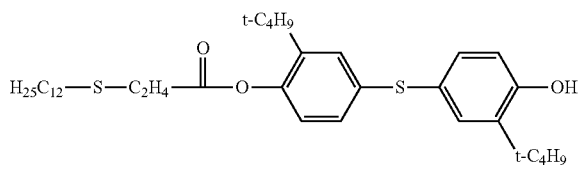

Compound No. 4-5

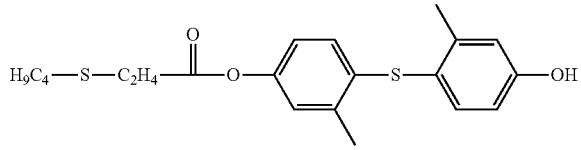

Compound No. 4-6

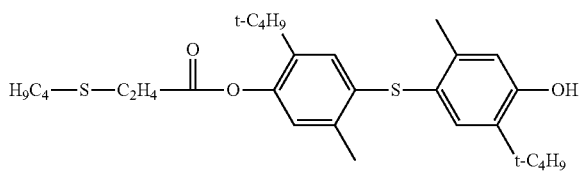

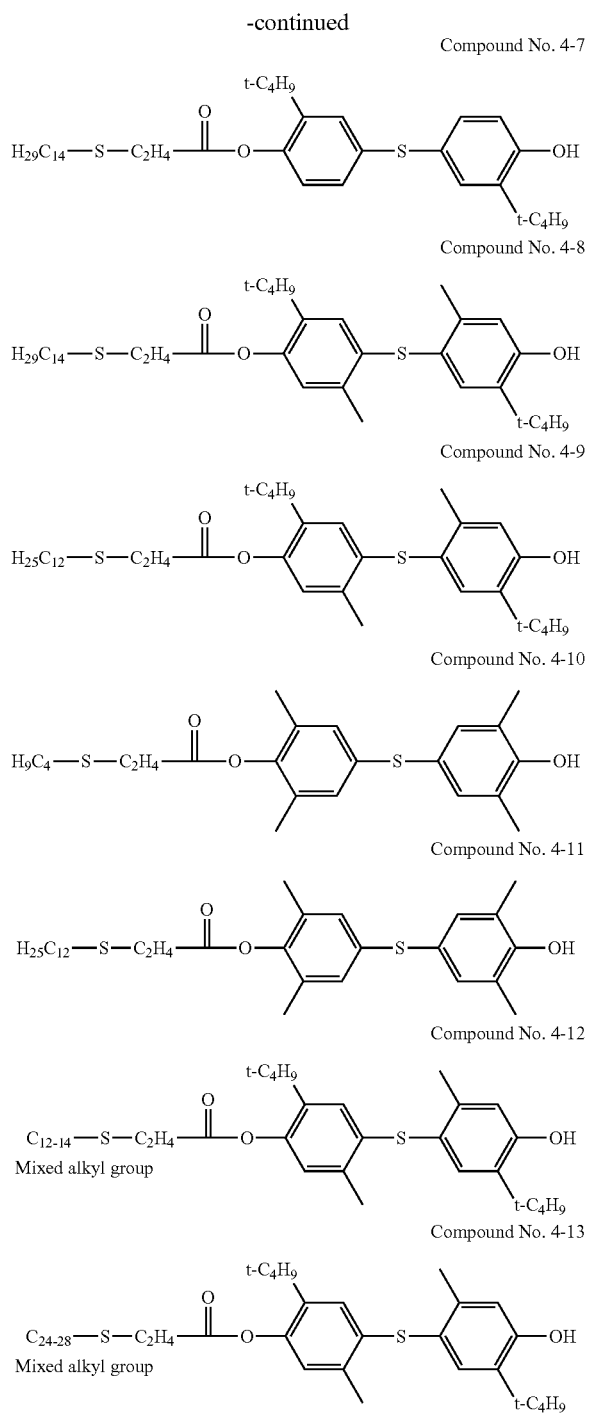

Compound No. 4-7
Compound No. 4-8
Compound No. 4-9
Compound No. 4-10
Compound No. 4-11
Compound No. 4-12
Compound No. 4-13

Specific examples of the structure of the above-described thiodialkyl carboxylic acid dialkyl ester compound represented by the Formula (5) include dilauryl-3,3'-thiodipropionate, ditridecyl-3,3'-thiodipropionate, dimyristyl-3,3'-thiodipropionate, distearyl-3,3'-thiodipropionate, lauryl/stearyl mixed-3,3'-thiodipropionate and di(2-ethylhexyl)-3,3'-thiodipropionate. However, the present invention is not restricted to the above-described compounds by any means.

As described above, it is preferred that the heat stabilizer composition of the present invention have a viscosity of 3,000 mPa·s or less at 25° C. When charging the heat stabilizer composition of the present invention to a synthetic resin using a pump, a known pump such as a gear pump, a diaphragm pump, a rotary pump, a screw pump, a Waukesha pump, a sine pump, a hose pump, a chemical pump or an air pressure pump can be employed. If the viscosity of the heat stabilizer composition is higher than 3,000 mPa·s, a special pump may be required and the heat stabilizer composition may adhere to the inner walls of the pump and pipes to cause a loss. In order to control the heat stabilizer composition of the present invention to have a viscosity of 3,000 mPa·s or less, it is required to adjust the amount of the above-described diester compound represented by the Formula (3), that of the above-described monoester compound represented by the Formula (4) and that of the above-described thiodialkyl carboxylic acid dialkyl ester compound represented by the Formula (5) to satisfy the above-described specific composition ratio.

The heat stabilizer composition of the present invention contains hydroxyl groups in an amount of 1% by mass or less, preferably 0.65% by mass or less, with respect to the amount of the heat stabilizer composition. This is because, when the ratio of hydroxyl groups is higher than 1.0% by mass, the heat stabilizer composition inhibits crosslinking of polyethylenes and copolymers such as ethylene-vinyl acetate, ethylene-ethyl acrylate, ethylene-propylene and ethylene-propylene-butadiene.

In the heat stabilizer composition of the present invention, it is preferred that, when it is heated under a nitrogen atmosphere at a heating rate of 10° C./min from room temperature, the temperature at which the mass is reduced by 5%, which is determined by differential thermal analysis (TG-DTA), be 240° C. or higher. When the temperature is lower than 240° C., sufficient stabilization effect may not be imparted to the synthetic resin in which the heat stabilizer composition of the present invention is incorporated.

In the heat stabilizer composition of the present invention, a component(s) other than the compounds represented by the above-described Formulae (3) to (5) may also be incorporated in such an amount that does not impair the expected effects of the present invention.

Examples of the above-described component include a phenolic antioxidant, a phosphorus-based antioxidant, a thioether-based antioxidant different from the compounds represented by the Formulae (3) to (5), an ultraviolet absorber, a hindered amine compound, a flame retardant, a nucleating agent, a filler, a lubricant, an antistatic agent, a heavy metal inactivator, a metallic soap, hydrotalcite, a pigment, a dye and a plasticizer.

Examples of the above-described phenolic antioxidant, phosphorus-based antioxidant, ultraviolet absorber, hindered amine compound, flame retardant, nucleating agent, filler, lubricant and antistatic agent include the same ones as those exemplified above.

Examples of the thioether-based antioxidant different from the compounds represented by the Formulae (3) to (5) include tetrakis[methylene-3-(laurylthio)propionate]methane, bis(methyl-4-[3-n-alkyl(C12/C14)thiopropionyloxy]-5-t-butylphenyl)sulfide, 4,4'-thiobis(6-t-butyl-m-cresol), 2,2'-thiobis(6-t-butyl-p-cresol) and distearyl disulfide.

The amount of such other component(s) to be used in the present invention is preferably in the range of from an amount at which the effects of adding the component(s) are exerted to an amount at which an improvement in the effects of the addition is no longer observed. The preferred amounts of the respective components to be used per 100 parts by mass of a synthetic resin are as follows: 0.1 to 20 parts by mass of plasticizer, 1 to 50 parts by mass of filler, 0.001 to 1 part by mass of surface treatment agent, 0.001 to 10 parts by mass of phenolic antioxidant, 0.001 to 10 parts by mass of phosphorus-based antioxidant, 0.001 to 10 parts by mass of thioether-based antioxidant, 0.001 to 5 parts by mass of ultraviolet absorber, 0.01 to 1 part by mass of hindered amine compound, 1 to 50 parts by mass of flame retardant, 0.03 to 2 parts by mass of lubricant, and 0.03 to 2 parts by mass of antistatic agent. It is noted here that these components may be used individually, or two or more thereof may be used in combination.

Next, the synthetic resin composition according to the present invention will be described.

The synthetic resin composition of the present invention comprises the above-described heat stabilizer composition of the present invention in an amount of 0.01 to 5 parts by mass with respect to 100 parts by mass of a synthetic resin. Examples of a synthetic resin stabilized by the heat stabilizer composition of the present invention include α-olefin polymers and ethylene-vinyl acetate copolymers, such as polypropylenes, high-density polyethylenes, low-density polyethylenes, linear low-density polyethylenes, polybutene-1 and poly-4-methylpentene; polyolefins and copolymers thereof, such as ethylene-propylene copolymers; halogen-containing resins, such as polyvinyl chloride, polyvinylidene chloride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers and vinyl chloride-cyclohexylmaleimide copolymers; petroleum resins; coumarone resins; polystyrenes; polyvinyl acetates; acrylic resins; copolymers (e.g., AS resins, ABS resins, MBS resins and heat-resistant ABS resins) that are composed of styrene and/or α-methylstyrene with other monomer (e.g., maleic anhydride, phenyl maleimide, methyl methacrylate, butadiene or acrylonitrile); linear polyesters such as polymethyl methacrylate, polyvinyl alcohol, polyvinyl formal, polyvinyl butyral, polyethylene terephthalate, polybutyl terephthalate and polytetramethyl terephthalate; polyamides such as polyphenylene oxide, polycaprolactam and polyhexamethylene adipamide; thermoplastic resins, such as polycarbonate, branched polycarbonate, polyacetal, polyphenylene sulfide, polyurethane and cellulose-based resins, and mixtures thereof; and thermosetting resins such as phenol resins, urea resins, melamine resins, epoxy resins and unsaturated polyester resins. Further, the synthetic resin may also be an elastomer such as an isoprene rubber, a butadiene rubber, an acrylonitrile-butadiene copolymer rubber or a styrene-butadiene copolymer rubber, or the above-described resin containing such an elastomer.

Among the above-described synthetic resins, polyolefin-based resins such as polyethylene, polypropylene and ethylene-propylene copolymer resins are preferably used because the heat stabilizer composition of the present invention exhibits excellent stabilization effect against these synthetic resins.

Further, the heat stabilizer composition of the present invention can also be preferably used in a synthetic resin to be crosslinked that is produced using an peroxide, radiation or the like, or a formed resin such as foamed polystyrene. Examples of the synthetic resin for crosslinking include polyethylenes as well as copolymers such as ethylene-vinyl acetate, ethylene-ethyl acrylate, ethylene-propylene and ethylene-propylene-butadiene.

Examples of a cross-linking agent that can be used in the synthetic resin composition include benzoyl peroxide, di-t-butyl peroxide, dicumyl peroxide, 2,5-dimethyl-2,5-di(t-butyl peroxy)hexane, 2,5-dimethyl-2,5-di(t-butylperoxy)hexyne, 1,3-bis(t-butylperoxyisopropyl)benzene, t-butyl hydroperoxide, cumene hydroperoxide, polysulfone azide, azidoformate, tetramethylisophthalyl di-t-butyl bisperoxide, tetramethylisophthalyl dicumyl bisperoxide, alkanolamines such as diethanolamine and triethanolamine, hexamethylene diamine, and 4,4'-diaminodiphenylmethane.

In the synthetic resin composition of the present invention, as in the case of the above-described heat stabilizer composition of the present invention, other component(s) may also be incorporated in such an amount that does not impair the expected effects of the present invention. As other component(s), the same ones as those exemplified above for the heat stabilizer composition of the present invention can be used.

Next, the molded article according to the present invention will be described. The molded article of the present invention is obtained by molding the above-described synthetic resin composition of the present invention. The molded article of the present invention can be molded by a known molding method such as extrusion molding, injection molding, hollow molding or compression molding. Examples of the molded article of the present invention include interior and exterior components of automobiles; food containers; cosmetic and clothing containers; bottles such as food bottles, beverage bottles, cooking oil bottles and seasoning bottles; packaging materials such as food packaging materials, wrapping materials and transport packaging materials; sheets and films, such as protection films of electronic materials, coating materials of electric wires and the like, and protection sheets of electric appliances; fibers; miscellaneous daily goods; and toys.

EXAMPLES

The present invention will now be concretely described by way of Reference Examples, Examples and Comparative Examples; however, the present invention is not restricted thereto by any means.

Examples 1-1 to 1-5, Comparative Examples 1-1 and 1-2

As a diester represented by the Formula (1) and a monoester represented by the Formula (2), a compound represented by the above-described Formula (1') wherein $R^1$ to $R^3$ are hydrogen atoms and $R^4$ and $R^5$ are each the substituent shown in Table below and a compound represented by the above-described Formula (2') wherein $R^1$ to $R^3$ are hydrogen atoms and $R^6$ is the substituent shown in Table below were added, respectively, to a reagent glass bottle and thoroughly stirred. Then, the glass bottle was hermetically sealed and left to stand in a 5° C. incubator. The thus obtained samples were subjected to the below-described evaluations.

Reference Example 1-1

The sample of Comparative Example 1-1 shown in Table 1 was left to stand at normal temperature (25° C.) without using the 5° C. incubator and then subjected to the following evaluations.

<Low-Temperature Storage Property>

The condition of each sample was visually observed every week. The low-temperature storage property was evaluated by the following method.

—: The sample was in a liquid faint and contained no solid.
A: Precipitation of a small amount of solid was observed.
B: Precipitation of a large solid was observed; however, more than half of the sample was in a liquid form.
C: More than half of the sample precipitated as solid.
D: The entire amount of the sample precipitated as solid.

The viscosity of each sample after 5 months of storage was measured under the following conditions: B-type viscometer/ No. 4 roter/25° C./60 rpm.

<Ease of Handling>

The sample was placed in a 100 g flask and the flask was inverted at 25° C. (normal temperature) to measure the time required for 97 g of the sample to fall into a receiving beaker. An evaluation of "○" was given when the time required for 97 g of the sample to fall into the beaker was 5 minutes or shorter; an evaluation of "Δ" was given when the time was longer than 5 minutes but not longer than 8 minutes; and an evaluation of "x" was given when the time was longer than 8 minutes. The evaluation results are shown in Table 1.

above-described Formula (3') wherein $R^{11}$ and $R^{17}$ are t-butyl groups; $R^{13}$ and $R^{15}$ are methyl groups; $R^{12}$, $R^{14}$, $R^{16}$ and $R^{18}$ are hydrogen atoms; and $R^{19}$ and $R^{20}$ are each the respective substituents shown in Tables below, a compound represented by the above-described Formula (4') wherein $R^{11}$ and $R^{17}$ are t-butyl groups; $R^{13}$ and $R^{15}$ are methyl groups; $R^{12}$, $R^{14}$, $R^{16}$ and $R^{18}$ are hydrogen atoms; and $R^{21}$ is the substituent shown in Tables below, and a compound represented by the above-described Formula (5') wherein $R^{22}$ is the substituent shown in Tables below were added, respectively, to a reagent glass bottle and thoroughly stirred. Then, the glass bottle was hermetically sealed and left to stand for over one day and night.

TABLE 1

| | Formula (1) | | Formula (2) | Formula (1)/Formula (2) | Specific viscosity | Low-temperature storage property | | | | | Ease of handling |
| | | | | | | After 1 month | After 2 months | After 3 months | After 4 months | After 5 months | |
| | $R^4$ | $R^5$ | $R^6$ | (mass ratio) | (mPa·s) | | | | | | |
|---|---|---|---|---|---|---|---|---|---|---|---|
| Example 1-1 | $C_{12}H_{25}$ | $C_{12}H_{25}$ | $C_{12}H_{25}$ | 79.7/20.3 | $3.3 \times 10^3$ | — | — | — | — | — | ○ |
| Example 1-2 | $C_{12}H_{25}$ | $C_{12}H_{25}$ | $C_{12}H_{25}$ | 73.9/26.1 | $4.4 \times 10^3$ | — | — | — | — | — | Δ |
| Example 1-3 | $C_{12}H_{25}$ | $C_{12}H_{25}$ | $C_{12}H_{25}$ | 71.9/28.1 | $4.8 \times 10^3$ | — | — | — | — | — | Δ |
| Example 1-4 | $C_{12}H_{25}$ | $C_{12}H_{25}$ | $C_{12}H_{25}$ | 65.9/34.1 | $6.0 \times 10^3$ | — | — | — | — | — | Δ |
| Example 1-5 | $C_{12}H_{25}$ | $C_{12}H_{25}$ | $C_{12}H_{25}$ | 69.5/30.5 | $5.2 \times 10^3$ | — | — | — | — | — | Δ |
| Comparative Example 1-1 | $C_{12}H_{25}$ | $C_{12}H_{25}$ | $C_{12}H_{25}$ | 82.0/18.0 | $2.9 \times 10^3$ | — | A | B | C | C | ○ |
| Comparative Example 1-2 | $C_{12}H_{25}$ | $C_{12}H_{25}$ | $C_{12}H_{25}$ | 59.5/40.5 | $7.0 \times 10^3$ | — | — | — | — | — | x |
| Reference Example 1-1 | $C_{12}H_{25}$ | $C_{12}H_{25}$ | $C_{12}H_{25}$ | 82.0/18.0 | $2.9 \times 10^3$ | — | — | — | — | — | ○ |

From Comparative Example 1-1, it was confirmed that, when the ratio of the compound represented by the Formula (1) is 80 parts by mass or more with respect to a total of 100 parts by mass of the compounds represented by the Formulae (1) and (2), the storage property in a low temperature environment is deteriorated and solids are generated after two months of storage. In addition, from Comparative Example 2, it was confirmed that, when the ratio of the compound represented by the Formula (1) is 65 parts by mass or less with respect to a total of 100 parts by mass of the compounds represented by the Formulae (1) and (2), the stabilizer composition has a high viscosity of higher than 6,000 mPa·s. It is noted here that, according to Reference Example 1-1, even though the ratio of the compound represented by the Formula (1) was higher than 80 parts by mass, no solid was generated when the stabilizer composition was stored at normal temperature.

In contrast, from Examples 1-1 to 1-5, it was confirmed that the stabilizer composition according to the present invention in which the ratio of the compound represented by the Formula (1) is in the range of more than 65 parts by mass and less than 80 parts by mass with respect to a total of 100 parts by mass of the compounds represented by the Formulae (1) and (2) does not induce solid generation even in low temperature environments and can provide a liquid stabilizer having a low viscosity of 6,000 mPa·s or less and excellent ease of handling.

Examples 2-1 to 2-7, Comparative Examples 2-1 to 2-4 and 2-7

As a diester compound represented by the Formula (3), a monoester compound represented by the Formula (4) and a thiodialkyl carboxylic acid dialkyl ester compound represented by the Formula (5), a compound represented by the Comparative Example 2-5

Evaluations were carried out in the same manner as in Comparative Example 2-2, except that 2-methyl-4,6-bis[(octylthio)methyl]phenol was used in place of the above-described thiodialkyl carboxylic acid dialkyl ester compound represented by the Formula (5).

Comparative Example 2-6

Evaluations were carried out in the same manner as in Example 2-3, except that 2-methyl-4,6-bis[(octylthio)methyl]phenol was used in place of the above-described thiodialkyl carboxylic acid dialkyl ester compound represented by the Formula (5).

The heat stabilizer compositions of Examples 2-1 to 2-7 and Comparative Examples 2-1 to 2-7 were each subjected to the following evaluations.

(Viscosity)

The viscosity was measured under the following conditions: B-type viscometer/No. 4 roter/25° C./60 rpm. The results thereof are shown in Tables 2 and 3.

(Heat Resistance)

Using a differential scanning calorimeter (Thermo Plus TG8120; manufactured by Rigaku Corporation), each sample was heated under a nitrogen atmosphere (20 ml/min) at a heating rate of 10° C./min, and the temperature at which the mass of the sample was reduced by 5% was measured. The results thereof are shown in Tables 2 and 3.

(Outer Appearance)

Each sample was visually observed. An evaluation of "x" was given when clouding or formation of a solid matter was observed, and an evaluation of "○" was given when the sample was transparent. The results thereof are shown in Tables 2 and 3.

(Hydroxyl Group Content)

The ratio of hydroxyl group relative to the molecular weight of the respective compounds contained in the subject heat stabilizer composition was determined to calculate the ratio of hydroxyl group contained in the heat stabilizer composition. The results thereof are shown in Tables 2 and 3.

sented by the Formula (5) is used in combination, solid precipitations are generated in the heat stabilizer composition. Furthermore, from Comparative Example 2-7, it was confirmed that, when the content of the diester compound represented by the Formula (3) is less than 65 parts by mass with respect to a total of 100 parts by mass of the diester compound

TABLE 2

|  |  | Example 2-1 | Example 2-2 | Example 2-3 | Example 2-4 | Example 2-5 | Example 2-6 | Example 2-7 |
|---|---|---|---|---|---|---|---|---|
| Formula (3) | $R^{19}$ | $C_{12}H_{25}$ | $C_{12}H_{25}$ | $C_{12}H_{25}$ | $C_{12}H_{25}$ | $C_{12}H_{25}$ | $C_{12-14}$ mixed alkyl | $C_{12}H_{25}$ |
|  | $R^{20}$ | $C_{12}H_{25}$ | $C_{12}H_{25}$ | $C_{12}H_{25}$ | $C_{12}H_{25}$ | $C_{12}H_{25}$ | $C_{12-14}$ mixed alkyl | $C_{12}H_{25}$ |
| Formula (4) | $R^{21}$ | $C_{12}H_{25}$ | $C_{12}H_{25}$ | $C_{12}H_{25}$ | $C_{12}H_{25}$ | $C_{12}H_{25}$ | $C_{12-14}$ mixed alkyl | $C_{12}H_{25}$ |
| Formula (5) | $R^{22}$ | $C_{13}H_{27}$ | $C_{13}H_{27}$ | $C_{13}H_{27}$ | $C_{13}H_{27}$ | 2-ethylhexyl | $C_{13}H_{27}$ | $C_{13}H_{27}$ |
| (3)/(4) (mass ratio) | | 73/27 | 73/27 | 73/27 | 73/27 | 73/27 | 73/27 | 82/18 |
| {(3) + (4)}/(5) (mass ratio) | | 95/5 | 90/10 | 80/20 | 50/50 | 80/20 | 80/20 | 90/10 |
| Specific viscosity ($\times 10^3$ mPa·s) | | 3.00 | 2.12 | 1.00 | 0.23 | 0.74 | 0.9 | 1.60 |
| Heat resistance (° C.) | | 293 | 286 | 279 | 241 | 254 | 255 | 285 |
| Outer appearance | | ○ | ○ | ○ | ○ | ○ | ○ | ○ |
| Hydroxyl group content (%) | | 0.62 | 0.60 | 0.55 | 0.39 | 0.57 | 0.70 | 0.39 |

1) $C_{12-14}$ mixed alkyl: represents a mixture of a compound in which $R^{15}$ and $R^{16}$ of the Formula (3) or $R^{17}$ of the Formula (4) is/are an alkyl group(s) having 12 carbon atoms and a compound in which $R^{15}$ and $R^{16}$ of the Formula (3) or $R^{17}$ of the Formula (4) is/are an alkyl group(s) having 14 carbon atoms.

TABLE 3

|  |  | Comparative Example 2-1 | Comparative Example 2-2 | Comparative Example 2-3 | Comparative Example 2-4 | Comparative Example 2-5 | Comparative Example 2-6 | Comparative Example 2-7 |
|---|---|---|---|---|---|---|---|---|
| Formula (3) | $R^{19}$ | $C_{12}H_{25}$ | — | $C_{12}H_{25}$ | $C_{12-14}$ mixed alkyl | — | $C_{12}H_{25}$ | $C_{12}H_{25}$ |
|  | $R^{20}$ | $C_{12}H_{25}$ | — | $C_{12}H_{25}$ | $C_{12-14}$ mixed alkyl | — | $C_{12}H_{25}$ | $C_{12}H_{25}$ |
| Formula (4) | $R^{21}$ | $C_{12}H_{25}$ | — | $C_{12}H_{25}$ | $C_{12-14}$ mixed alkyl | — | $C_{12}H_{25}$ | $C_{12}H_{25}$ |
| Formula (5) | $R^{22}$ | — | $C_{13}H_{27}$ | $C_{13}H_{27}$ | — | Comparative Compound 1 | Comparative Compound 1 | $C_{13}H_{27}$ |
| (3)/(4) (mass ratio) | | 73/27 | 0/0 | 73/27 | 73/27 | 0/0 | 73/27 | 60/40 |
| {(3) + (4)}/(5) (mass ratio) | | 100/0 | 0/100 | 40/60 | 100/0 | 0/100 | 80/20 | 90/10 |
| Specific viscosity ($\times 10^3$ mPa·s) | | 4.72 | 0.06 | 0.12 | 3.69 | <0.08 | 1.33 | 3.20 |
| Heat resistance (° C.) | | 295 | 163 | 230 | 237 | 240 | 266 | 282 |
| Outer appearance | | ○ | ○ | ○ | ○ | ○ | x | ○ |
| Hydroxyl group content (%) | | 0.64 | 0 | 0.32 | 0.79 | 4.47 | 1.09 | 0.69 |

2) Comparative Compound 1: 2-methyl-4,6-bis[(octylthio)methyl]phenol

From Comparative Examples 2-1 and 2-4, it was confirmed that the heat stabilizer compositions which do not contain any thiodialkyl carboxylic acid dialkyl ester compound represented by the Formula (5) have a high viscosity of higher than 3,000 mPa·s. From Comparative Example 2-2, it was also confirmed that the thiodialkyl carboxylic acid dialkyl ester compound represented by the Formula (5) alone has poor heat resistance. Moreover, from Comparative Example 2-3, it was continued that, in the ratio between the total mass of the diester compound represented by the Formula (3) and the monoester compound represented by the Formula (4) and the mass of the thiodialkyl carboxylic acid dialkyl ester compound represented by the Formula (5) ({(3)+(4)}/(5)), when the ratio of the thiodialkyl carboxylic acid dialkyl ester compound represented by the Formula (5) is higher than 50, the heat resistance is insufficient.

In addition, from Comparative Example 2-6, it was confirmed that, when a thioether antioxidant different from the thiodialkyl carboxylic acid dialkyl ester compound represented by the Formula (3) and the monoester compound represented by the Formula (4), the heat stabilizer composition has a high viscosity of higher than 3,000 mPa·s.

In contrast, from Examples 2-1 to 2-7, it was confirmed that the heat stabilizer composition according to the present invention in which the content of the diester compound represented by the Formula (3) is more than 65 parts by mass with respect to a total of 100 parts by mass of the diester compound represented by the Formula (3) and the monoester compound represented by the Formula (4) and the ratio between the total mass of the diester compound represented by the Formula (3) and the monoester compound represented by the Formula (4) and the mass of the thiodialkyl carboxylic acid dialkyl ester compound represented by the Formula (5), {(3)+(4)}/(5), is in the range of 95/5 to 50/50 can provide an excellent solid-free liquid heat stabilizer composition which has a low viscosity and excellent ease of handling and exhibits good heat resistance. It is also noted here that, since the heat stabilizer composition of the present invention contains only a small amount of hydroxyl group, an effect of preventing inhibition of crosslinking can be attained in a synthetic resin composition where the heat stabilizer composition of the present invention is incorporated.

Examples 3-1 to 3-3, Comparative Examples 3-1 to 3-3

In order to verify excellent stabilization effect exhibited by the heat stabilizer composition of the present invention against a synthetic resin, the stabilization effect of the heat stabilizer composition of the present invention was examined. First, 100 parts by mass of an unstabilized low-density polyethylene (NUC-8000; manufactured by NUC Corporation), 2 parts by mass of dicumyl peroxide as a cross-linking agent, and 0.3 parts by mass of the diester compound represented by the Formula (3), the monoester compound represented by the Formula (4) and the thiodialkyl carboxylic acid dialkyl ester compound represented by the Formula (5) that were combined at the mass ratio shown in Table 3, were kneaded for 6 minutes and 30 seconds using a mixing roll at 120° C. and 20 rpm. Then, the resultant was compression-molded for 5 minutes at a temperature of 120° C. and a pressure of 9.8 MPa to prepare a 2 mm-thick sheet. The thus obtained 2 mm-thick sheet was further compression-molded for 20 minutes at a temperature of 170° C. and a pressure of 9.8 MPa so as to facilitate the cross-linking reaction of polyethylene, thereby preparing a 1 mm-thick sheet. The thus obtained 1 mm-thick sheet was cut into a size of 170×130 mm and this sample was subjected to a thermal degradation test under an atmosphere in a 150° C. Geer oven. As for the evaluation method, on a test piece taken out after 552 hours, the ratio of the area of the parts that did not change in color to reddish brown with respect to the area of the test piece was determined as the unburned ratio to evaluate the stabilization effect. The results thereof are shown in Table 4 below.

(wherein, $R^1$, $R^2$ and $R^3$ each independently represent a hydrogen atom, an alkyl group having 1 to 18 carbon atoms, a cycloalkyl group having 3 to 18 carbon atoms, or an aryl group having 6 to 30 carbon atoms which is optionally substituted with an alkyl group, an alkoxy group, an alkenyl group, an alkenyloxy group or a hydroxyl group; and $R^4$ and $R^5$ each independently represent a linear or branched alkyl group having 3 to 30 carbon atoms which is optionally substituted with an alkoxy group, an alkenyl group, an alkenyloxy group, a hydroxyl group or a cyano group); and a monoester represented by the following Formula (2):

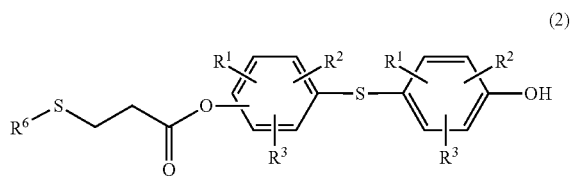

(2)

(wherein, $R^1$, $R^2$ and $R^3$ each independently represent a hydrogen atom, an alkyl group having 1 to 18 carbon atoms, a cycloalkyl group having 3 to 18 carbon atoms, or aryl group having 6 to 30 carbon atoms which is optionally substituted with an alkyl group, an alkoxy group, an alkenyl group, an alkenyloxy group or a hydroxyl group; and $R^6$ represents a linear or branched alkyl group having 3 to 30 carbon atoms which is optionally substituted with an alkoxy group, an alkenyl group, an alkenyloxy group, a hydroxyl group or as cyano group),

TABLE 4

|  |  |  |  | Example 3-1 | Example 3-2 | Example 3-3 | Comparative Example 3-1 | Comparative Example 3-2 | Comparative Example 3-3 |
|---|---|---|---|---|---|---|---|---|---|
| Mixing Ratio | Formula (3) | $R^9$ | $C_{12}H_{25}$ | 77.4 | 68.8 | 43.0 | 86.0 | — | 34.4 |
|  |  | $R^{10}$ | $C_{12}H_{25}$ |  |  |  |  |  |  |
|  | Formula (4) | $R^{11}$ | $C_{12}H_{25}$ | 12.6 | 11.2 | 7.0 | 14.0 | — | 5.6 |
|  | Formula (5) | $R^{12}$ | $C_{13}H_{27}$ | 10 | 20 | 50 | — | 100 | 60 |
| Evaluation | Unburned ratio (%) |  |  | 21 | 27 | 20 | 10 | 0 | 5 |

From the results of Examples 3-1 to 3-3 and Comparative Examples 3-1 to 3-3 shown in Table 4, it was confirmed that, while the heat stabilizer compositions that do not conform to the present invention showed poor stabilization effect, the heat stabilizer compositions according to the present invention imparted the synthetic resin with excellent stabilization effect.

The invention claimed is:

1. A stabilizer composition, comprising:
a diester represented by the following Formula (1):

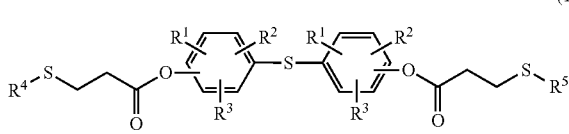

(1)

wherein the content of said diester represented by said Formula (1) is more than 65 parts by mass and less than 80 parts by mass in a total of 100 parts by mass of said diester represented by said Formula (1) and said monoester represented by said Formula (2).

2. The stabilizer composition according to claim 1, having a viscosity of 6,000 mPa·s or less.

3. The stabilizer composition according to claim 1, wherein all of said $R^4$ and $R^5$ in said Formula (1) and said $R^6$ in said Formula (2) are the same alkyl group.

4. A resin composition, characterized by comprising the stabilizer composition according to claim 1 in a synthetic resin.

5. A molded article, characterized by being obtained by molding the resin composition according to claim 4.

6. A heat stabilizer composition, comprising:
a diester compound represented by the following Formula (3):

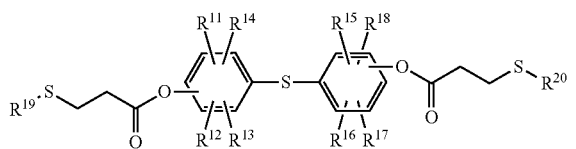

(3)

(wherein, $R^{11}$ to $R^{18}$ each independently represent a hydrogen atom, an alkyl group having 1 to 18 carbon atoms which is optionally interrupted by an oxygen atom or a sulfur atom, a cycloalkyl group having 3 to 18 carbon atoms, or an aryl group having 6 to 30 carbon atoms which is optionally interrupted by an oxygen atom or a sulfur atom and optionally substituted with an alkyl group, an alkoxy group, an alkenyl group, an alkenyloxy group or a hydroxyl group; and $R^{19}$ and $R^{20}$ each independently represent a linear or branched alkyl group having 3 to 30 carbon atoms which is optionally substituted with an alkoxy group, an alkenyl group, an alkenyloxy group, a hydroxyl group or a cyano group and optionally interrupted by an oxygen atom or a sulfur atom);

a monoester compound represented by the following Formula (4):

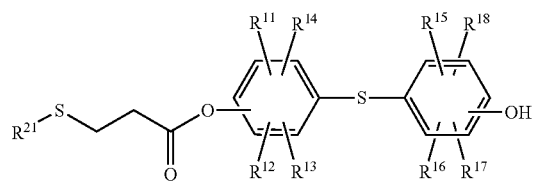

(4)

(wherein, $R^{11}$ to $R^{18}$ each independently represent a hydrogen atom, an alkyl group having 1 to 18 carbon atoms which is optionally interrupted by an oxygen atom or a sulfur atom, a cycloalkyl group having 3 to 18 carbon atoms, or an aryl group having 6 to 30 carbon atoms which is optionally interrupted by an oxygen atom or a sulfur atom and optionally substituted with an alkyl group, an alkoxy group, an alkenyl group, an alkenyloxy group or a hydroxyl group; and $R^{21}$ represents a linear or branched alkyl group having 3 to 30 carbon atoms which is optionally substituted with an alkoxy group, an alkenyl group, an alkenyloxy group, a hydroxyl group or a cyano group and optionally interrupted by an oxygen atom or a sulfur atom); and a thiodialkyl carboxylic acid dialkyl ester compound represented by the following Formula (5):

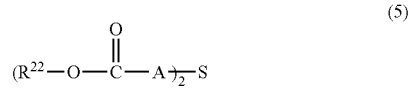

(5)

(wherein, $R^{22}$ represents a linear or branched alkyl group having 3 to 30 carbon atoms which is optionally substituted with an alkoxy group, an alkenyl group, an alkenyloxy group, a hydroxyl group or a cyano group and optionally interrupted by an oxygen atom or a sulfur atom; and A represents a linear or branched alkylene group having 1 to 8 carbon atoms which is optionally substituted with an alkoxy group, an alkenyl group, an alkenyloxy group, a hydroxyl group or a cyano group), wherein the content of said diester compound represented by said Formula (3) is more than 65 parts by mass in a total of 100 parts by mass of said diester compound represented by said Formula (3) and said monoester compound represented by said Formula (4) and the ratio between the total mass of said diester compound represented by said Formula (3) and said monoester compound represented by said Formula (4) and the mass of said thiodialkyl carboxylic acid dialkyl ester compound represented by said Formula (5), $\{(3)+(4)\}/(5)$, is in the range of 95/5 to 50/50.

7. The heat stabilizer composition according to claim 6, having a viscosity of 3000 mPa·s or less at 25° C.

8. The heat stabilizer composition according to claim 6, wherein, when it is heated under a nitrogen atmosphere at a heating rate of 10° C./min from room temperature, the temperature at which the mass is reduced by 5%, which is determined by differential thermal analysis (TG-DTA), is 240° C. or higher.

9. A synthetic resin composition, characterized by comprising 0.01 to 5 parts by mass of the heat stabilizer composition according to claim 6 with respect to 100 parts by mass of a synthetic resin.

10. The synthetic resin composition according to claim 9, wherein said synthetic resin is a polyolefin resin.

11. A molded article, characterized by being obtained by molding the synthetic resin composition according to claim 10.

12. The stabilizer composition according to claim 1, wherein, in Formula (1), $R^1$, $R^2$ and $R^3$ each independently represent a hydrogen atom, an alkyl group having 1 to 18 carbon atoms, or an aryl group having 6 to 30 carbon atoms which is optionally substituted with an alkyl group, an alkoxy group, an alkenyl group, an alkenyloxy group or a hydroxyl group; and $R^4$ and $R^5$ each independently represent a linear or branched alkyl group having 3 to 30 carbon atoms which is optionally substituted with an alkoxy group, an alkenyl group, an alkenyloxy group, a hydroxyl group or a cyano group, and wherein, in Formula (2), $R^1$, $R^2$ and $R^3$ each independently represent a hydrogen atom, an alkyl group having 1 to 18 carbon atoms, or an aryl group having 6 to 30 carbon atoms which is optionally substituted with an alkyl group, an alkoxy group, an alkenyl group, an alkenyloxy group or a hydroxyl group; and $R^6$ represents a linear or branched alkyl group having 3 to 30 carbon atoms which is optionally substituted with an alkoxy group, an alkenyl group, an alkenyloxy group, a hydroxyl group or a cyano group.

13. The stabilizer composition according to claim 1, wherein, in Formula (1), $R^1$, $R^2$ and $R^3$ each independently represent a hydrogen atom, or an alkyl group having 1 to 18 carbon atoms, and $R^4$ and $R^5$ each independently represent a linear or branched alkyl group having 3 to 30 carbon atoms which is optionally substituted with an alkoxy group, an alkenyl group, an alkenyloxy group, a hydroxyl group or a cyano group, and wherein, in Formula (2), $R^1$, $R^2$ and $R^3$ each independently represent a hydrogen atom, or an alkyl group having 1 to 18 carbon atoms; and $R^6$ represents a linear or branched alkyl group having 3 to 30 carbon atoms which is optionally substituted with an alkoxy group, an alkenyl group, an alkenyloxy group, a hydroxyl group or a cyano group.

14. The heat stabilizer composition according to claim 6, wherein, in Formula (3), $R^{11}$ to $R^{18}$ each independently represent a hydrogen atom, an alkyl group having 1 to 18 carbon atoms, or an aryl group having 6 to 30 carbon atoms which is optionally substituted with an alkyl group, an alkoxy group, an alkenyl group, an alkenyloxy group or a hydroxyl group; and $R^{19}$ and $R^{20}$ each independently represent a linear or branched alkyl group having 3 to 30 carbon atoms which is optionally substituted with an alkoxy group, an alkenyl group, an alkenyloxy group, a hydroxyl group or a cyano group, and wherein, in Formula (4), $R^{11}$ to $R^{18}$ each independently represent a hydrogen atom, an alkyl group having 1 to 18 carbon atoms, or an aryl group having 6 to 30 carbon atoms which is optionally substituted with an alkyl group, an alkoxy group, an alkenyl group, an alkenyloxy group or a hydroxyl group; and $R^{21}$ represents a linear or branched alkyl group having 3 to 30 carbon atoms which is optionally substituted with an alkoxy group, an alkenyl group, an alkenyloxy group, a hydroxyl group or a cyano group, wherein, the thiodialkyl carboxylic acid dialkyl ester compound represented by Formula (5) is a thiodialkyl carboxylic acid dialkyl ester compound represented by the following Formula (5')

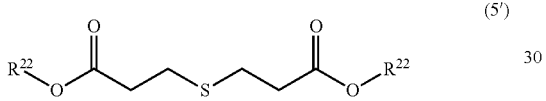

(5')

wherein, $R^{22}$ represents a linear or branched alkyl group having 3 to 30 carbon atoms which is optionally substituted with an alkoxy group, an alkenyl group, an alkenyloxy group, a hydroxyl group or a cyano group and optionally interrupted by an oxygen atom or a sulfur atom.

15. The heat stabilizer composition according to claim 6, wherein in Formula (3), $R^{11}$ to $R^{18}$ each independently represent a hydrogen atom, or an alkyl group having 1 to 18 carbon atoms; and $R^{19}$ and $R^{20}$ each independently represent a linear or branched alkyl group having 3 to 30 carbon atoms which is optionally substituted with an alkoxy group, an alkenyl group, an alkenyloxy group, a hydroxyl group or a cyano group, and wherein, in Formula (4), $R^{11}$ to $R^{18}$ each independently represent a hydrogen atom, or an alkyl group having 1 to 18 carbon atoms; and $R^{21}$ represents a linear or branched alkyl group having 3 to 30 carbon atoms which is optionally substituted with an alkoxy group, an alkenyl group, an alkenyloxy group, a hydroxyl group or a cyano group, wherein the thiodialkyl carboxylic acid dialkyl ester compound represented by Formula (5) is a thiodialkyl carboxylic acid dialkyl ester compound represented by the following Formula (5')

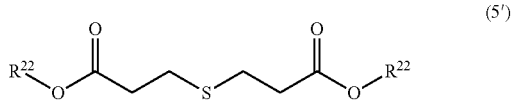

(5')

wherein, $R^{22}$ represents a linear or branched alkyl group having 3 to 30 carbon atoms which is optionally substituted with an alkoxy group, an alkenyl group, an alkenyloxy group, a hydroxyl group or a cyano group.

* * * * *